US009216555B2

(12) United States Patent
Madok et al.

(10) Patent No.: US 9,216,555 B2
(45) Date of Patent: Dec. 22, 2015

(54) WEAR-RESISTANT ATTACHMENTS FOR HIGH-WEAR APPLICATIONS

(71) Applicant: Scoperta, Inc., San Diego, CA (US)

(72) Inventors: John H. Madok, San Diego, CA (US); Justin Cheney, San Francisco, CA (US); Kenneth S. Vecchio, San Diego, CA (US)

(73) Assignee: SCOPERTA, INC., San Diego, CA (US)

( * ) Notice: Subject to any disclaimer, the term of this patent is extended or adjusted under 35 U.S.C. 154(b) by 223 days.

(21) Appl. No.: 13/797,697

(22) Filed: Mar. 12, 2013

(65) Prior Publication Data
US 2013/0196111 A1 Aug. 1, 2013

Related U.S. Application Data

(62) Division of application No. 12/833,853, filed on Jul. 9, 2010, now Pat. No. 8,420,201.

(60) Provisional application No. 61/224,426, filed on Jul. 9, 2009, provisional application No. 61/263,286, filed on Nov. 20, 2009.

(51) Int. Cl.
B32B 3/06 (2006.01)
B02C 4/30 (2006.01)

(52) U.S. Cl.
CPC . B32B 3/06 (2013.01); B02C 4/305 (2013.01); B02C 2210/02 (2013.01); Y10T 29/4973 (2015.01); Y10T 428/24 (2015.01); Y10T 428/24008 (2015.01); Y10T 428/31504 (2015.04)

(58) Field of Classification Search
CPC .... Y10T 428/24008; B32B 3/06; B02C 4/305
USPC .................................................. 428/99, 101
See application file for complete search history.

(56) References Cited

U.S. PATENT DOCUMENTS

| 4,729,603 | A | 3/1988 | Elfgen |
| 4,848,683 | A | 7/1989 | Kawatsu |
| 5,081,774 | A | 1/1992 | Kuwano |
| 5,269,477 | A | 12/1993 | Buchholtz et al. |
| 6,290,008 | B1 | 9/2001 | Portwood et al. |

(Continued)

FOREIGN PATENT DOCUMENTS

CA 2202213 11/1997

OTHER PUBLICATIONS

International Search Report for PCT/US2010/041616, mailed on Sep. 1, 2010, 3 pages.

(Continued)

Primary Examiner — Brent O'Hern
(74) Attorney, Agent, or Firm — Morrison & Foerster LLP

(57) ABSTRACT

A wear-resistant assembly, including: a surface; a base; and a plurality of wear-resistant attachments removably coupled to the base, each of the plurality of wear-resistant attachments including an inner portion and an outer portion, wherein the outer portion of each of the plurality of wear-resistant attachments is coupled to the outer portion of at least one other wear-resistant attachment so that a plurality of coupled wear-resistant attachments include a substantially continuous surface, the substantially continuous surface including at least a portion of the surface of the wear-resistant assembly.

8 Claims, 26 Drawing Sheets

(56) References Cited

U.S. PATENT DOCUMENTS

| | | |
|---|---|---|
| 6,523,767 B1 | 2/2003 | Ramesohl |
| 2006/0150565 A1 | 7/2006 | Schacht et al. |
| 2007/0290545 A1 | 12/2007 | Hall et al. |
| 2007/0290547 A1 | 12/2007 | Hall et al. |
| 2008/0036280 A1 | 2/2008 | Hall et al. |
| 2008/0115977 A1* | 5/2008 | Hall et al. .................. 175/414 |

OTHER PUBLICATIONS

Written Opinion of the International Searching Authority for PCT/US2010/041616, mailed on Sep. 1, 2010, 4 pages.

* cited by examiner

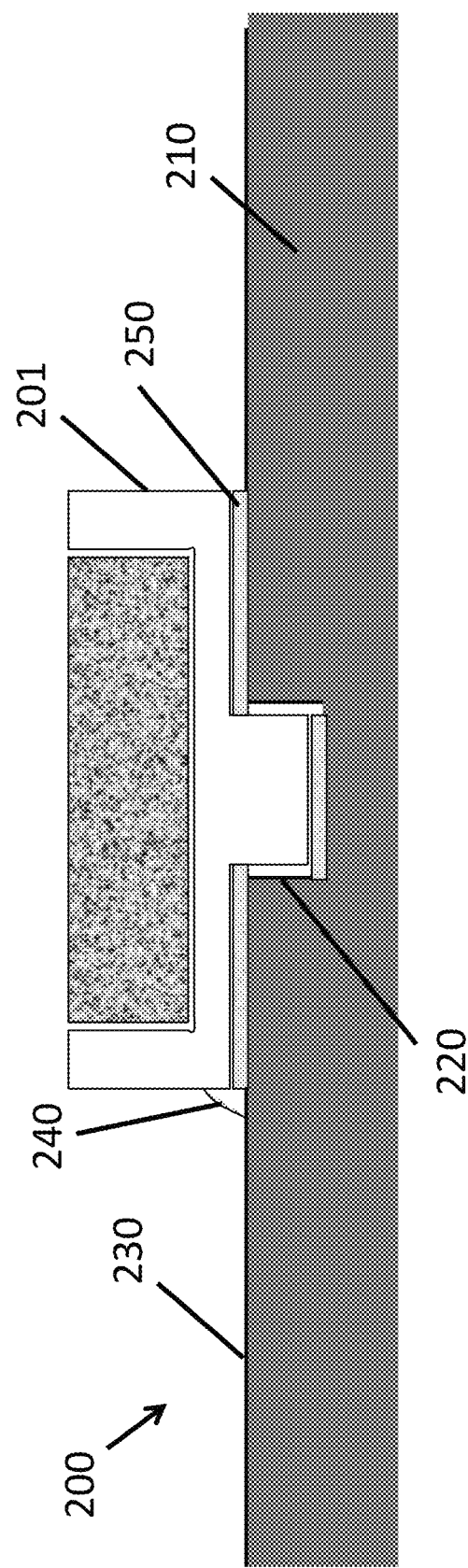

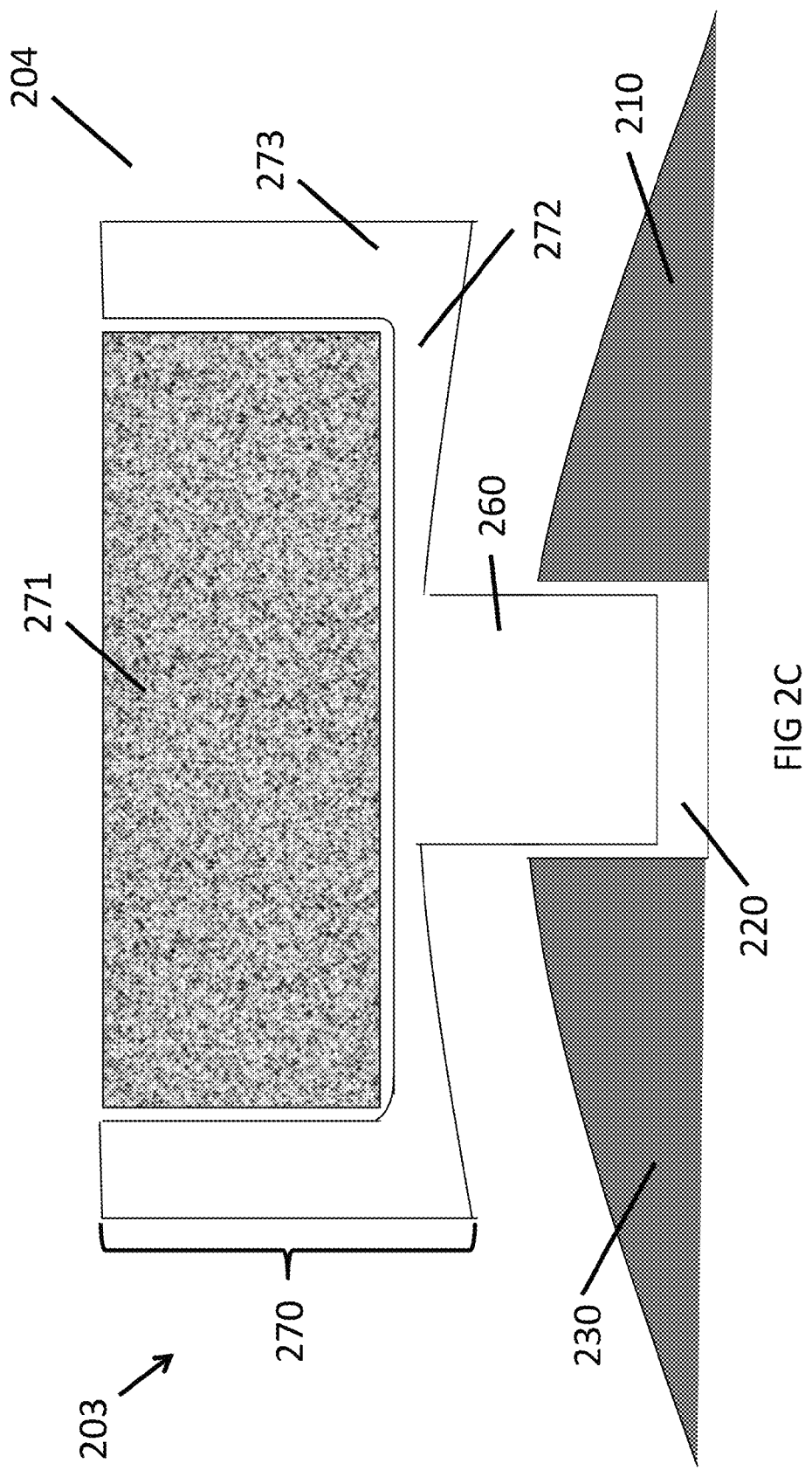

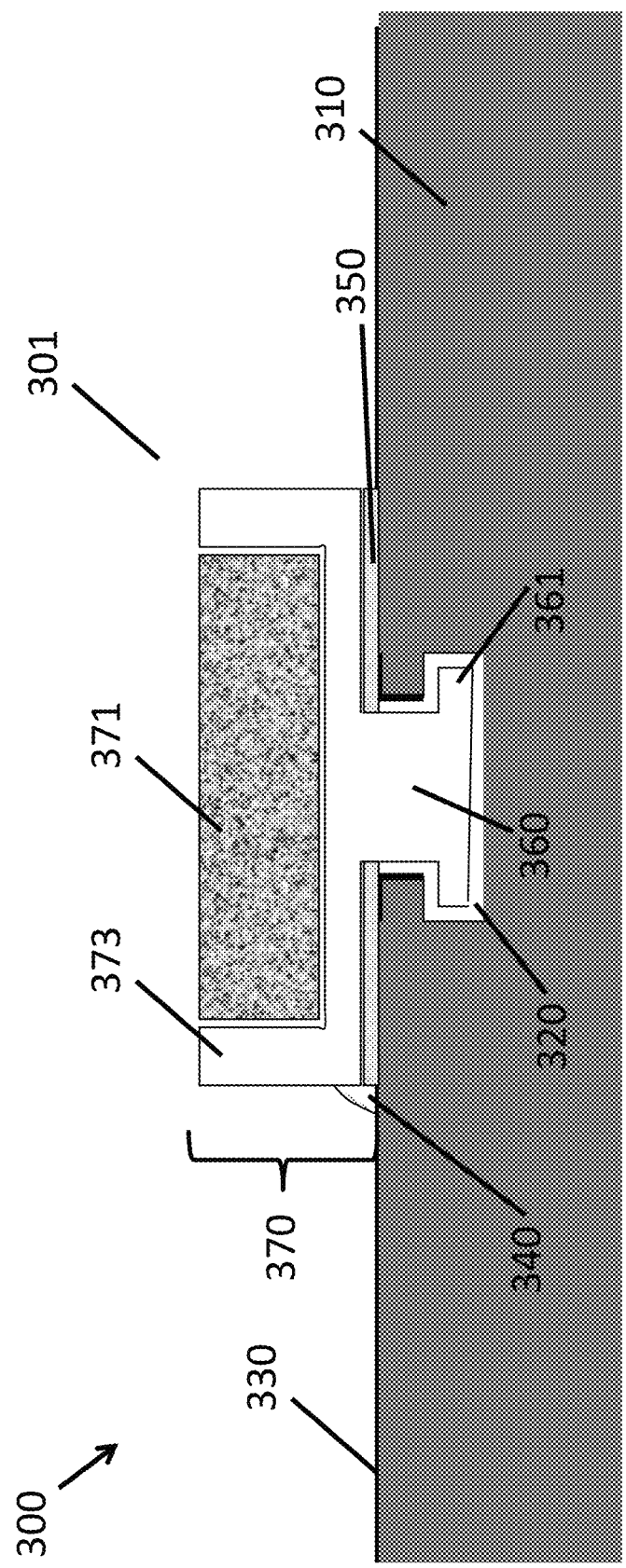

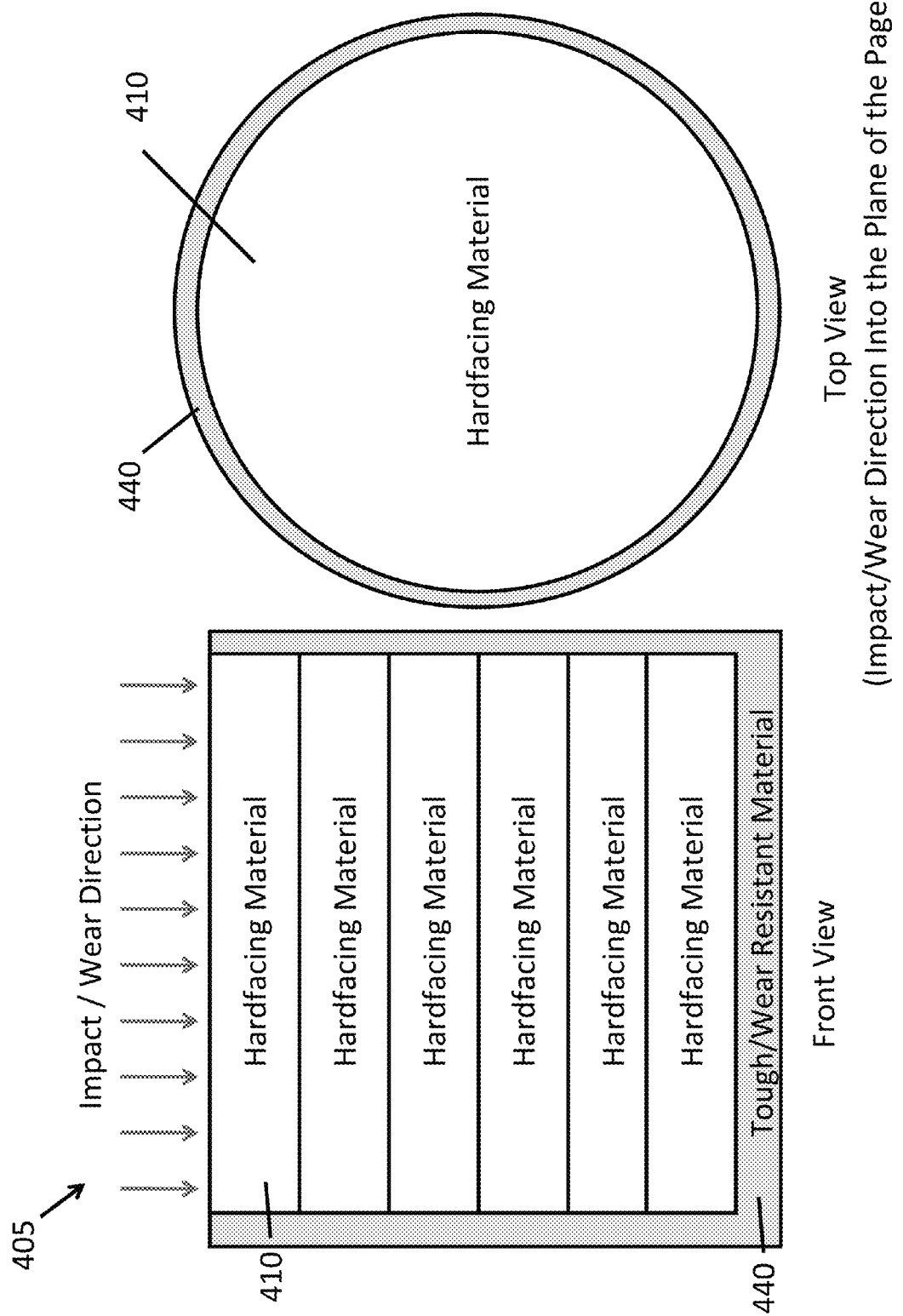

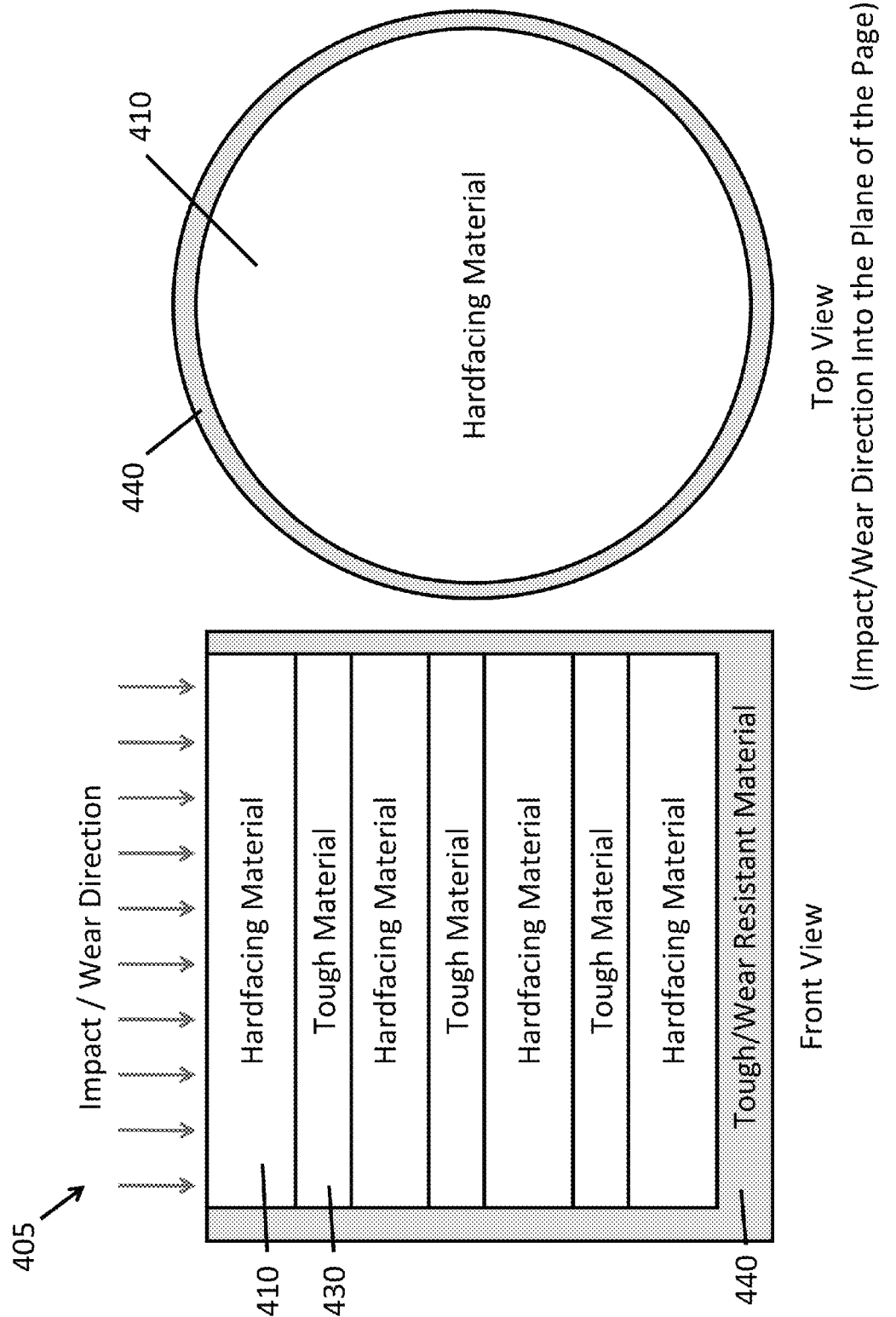

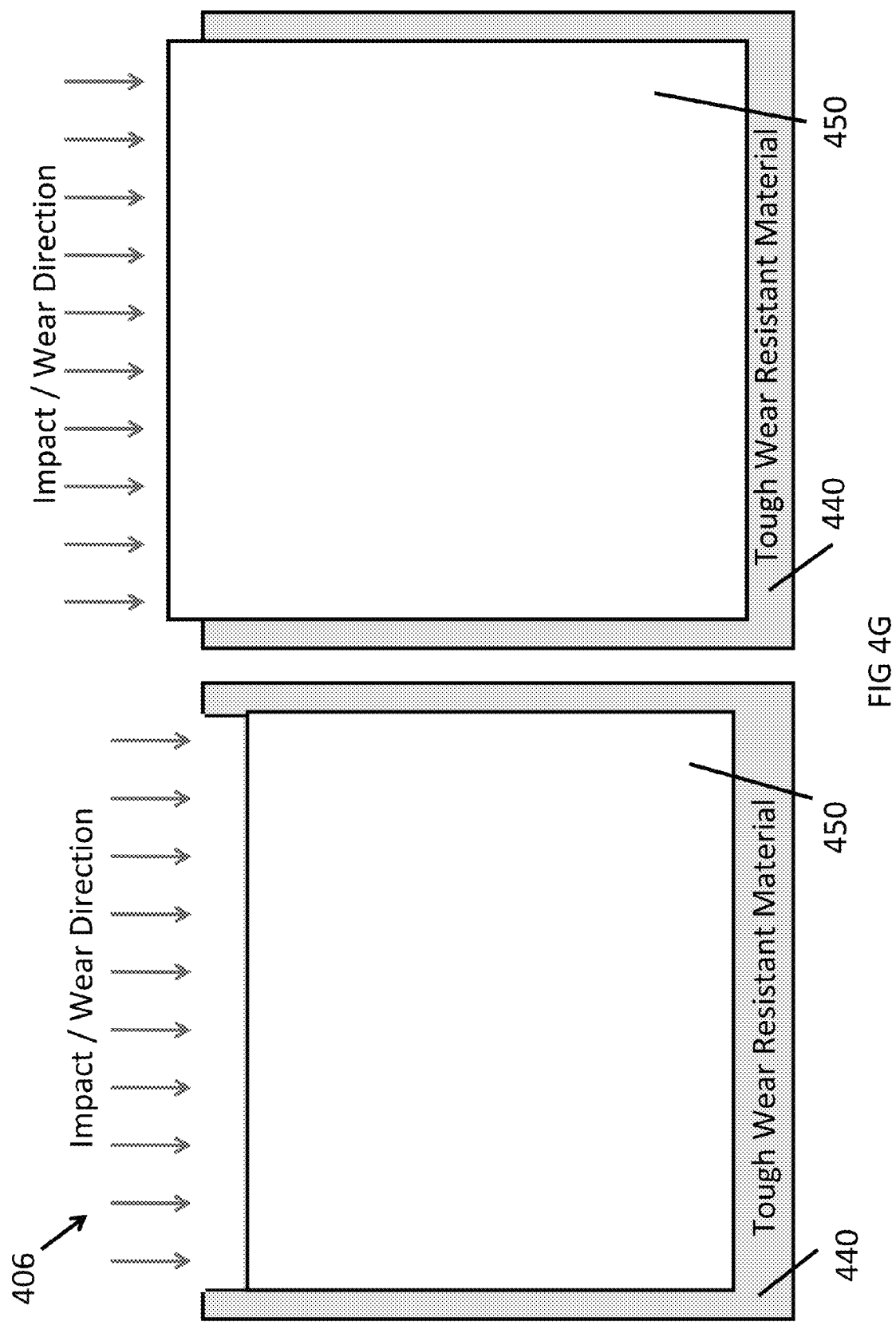

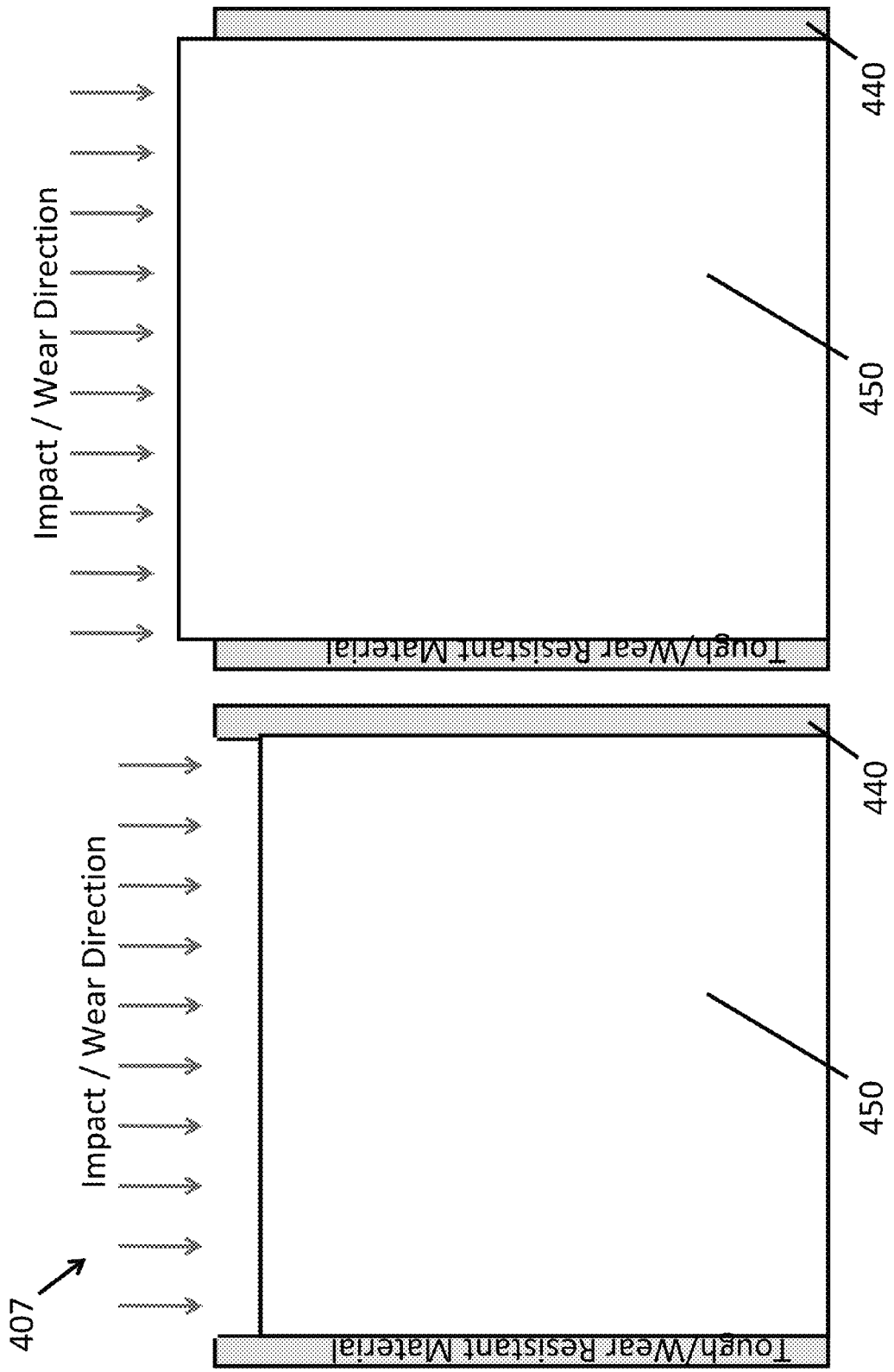

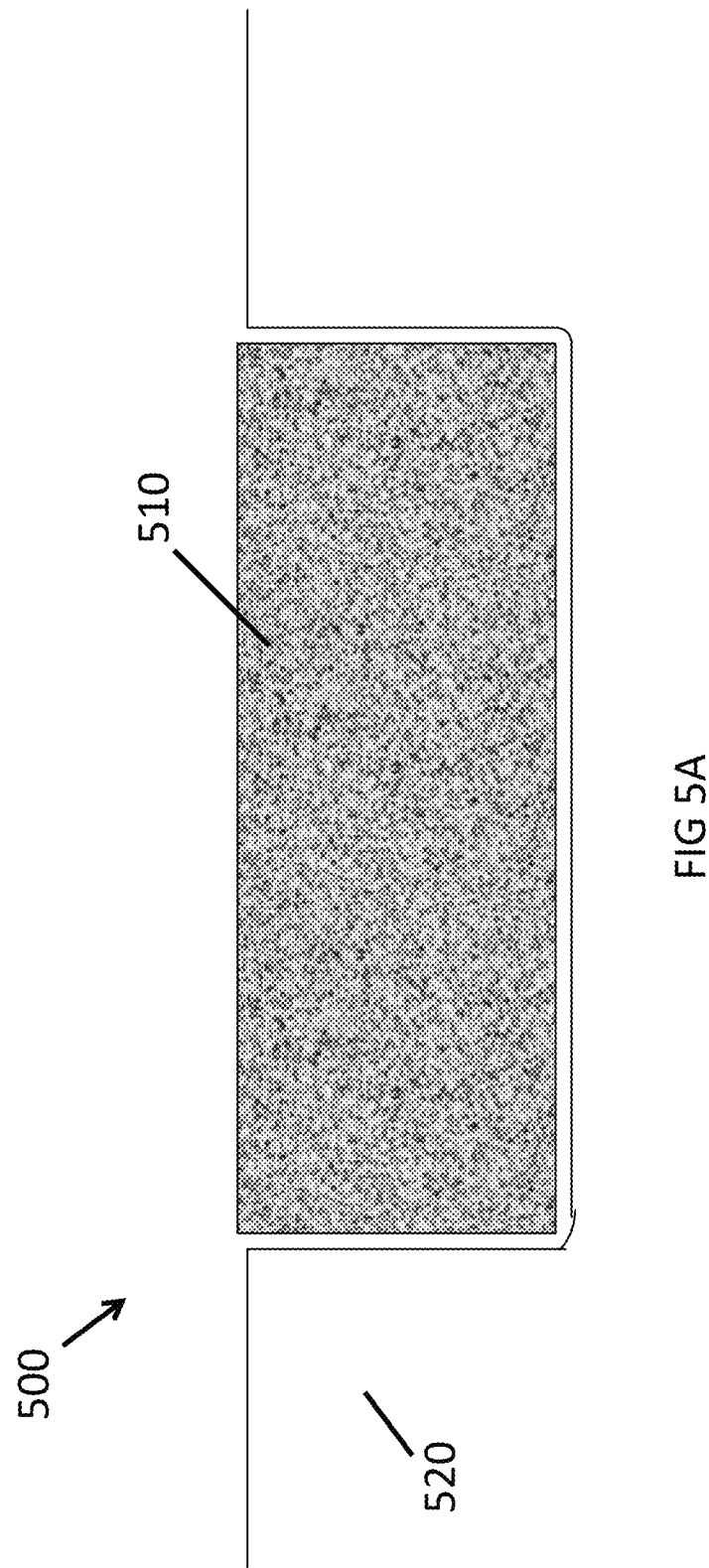

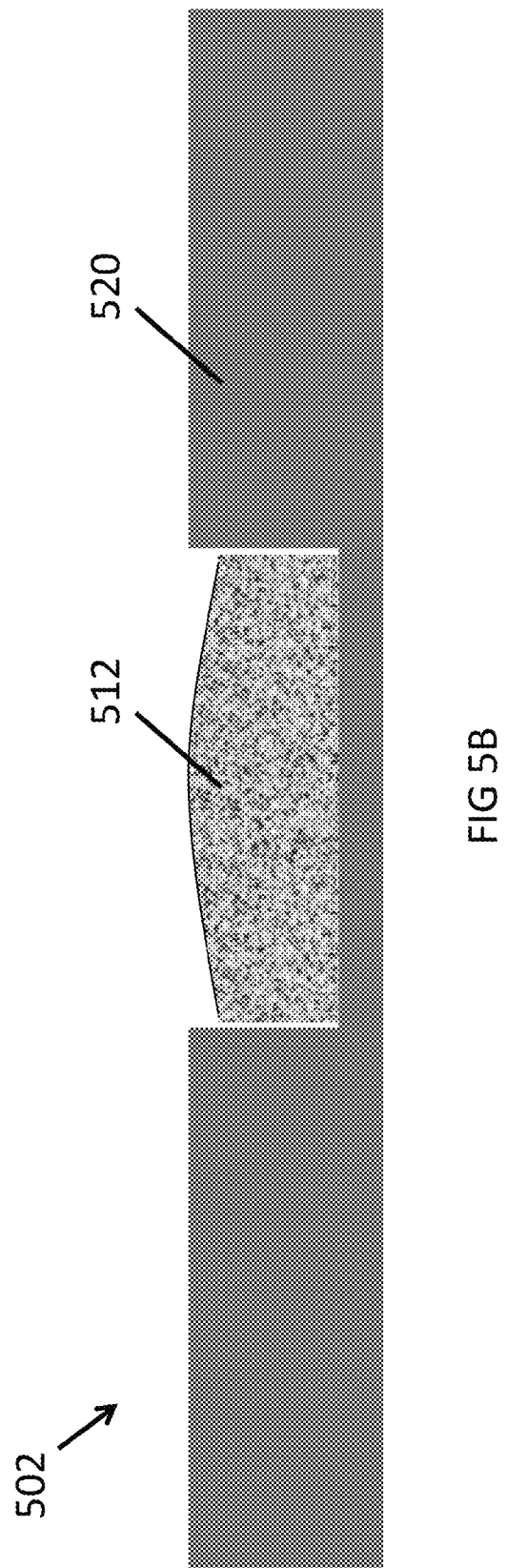

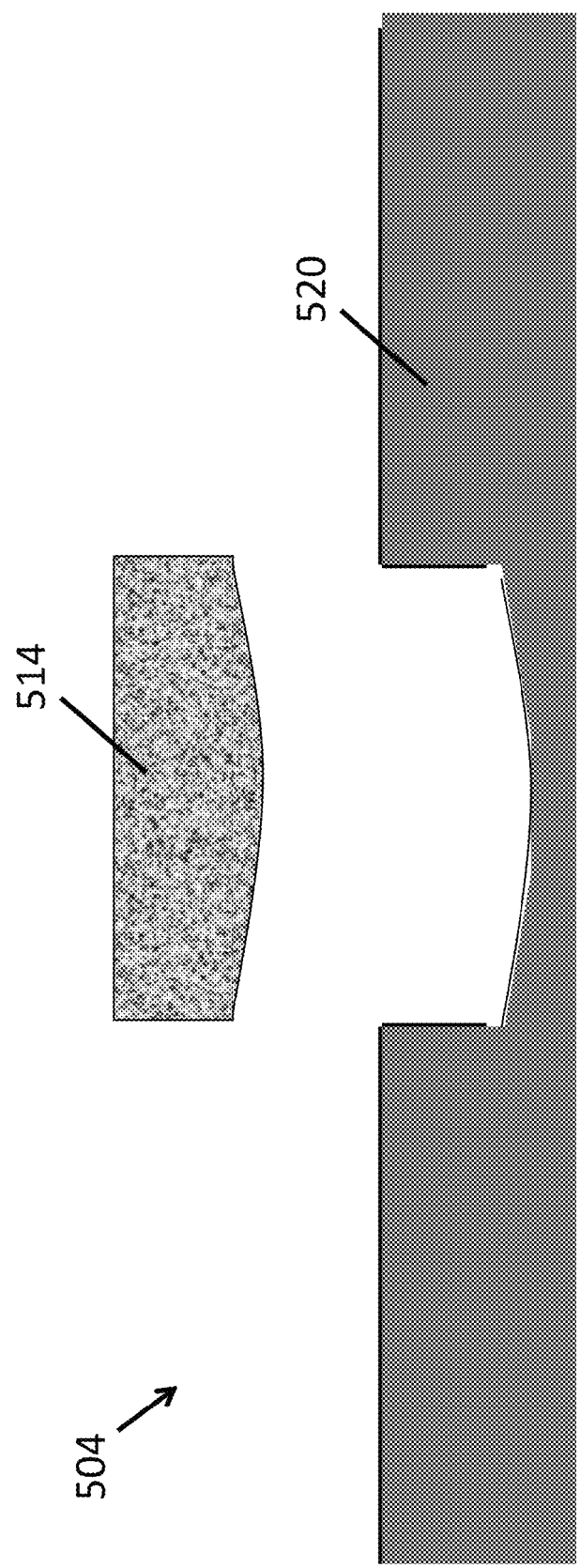

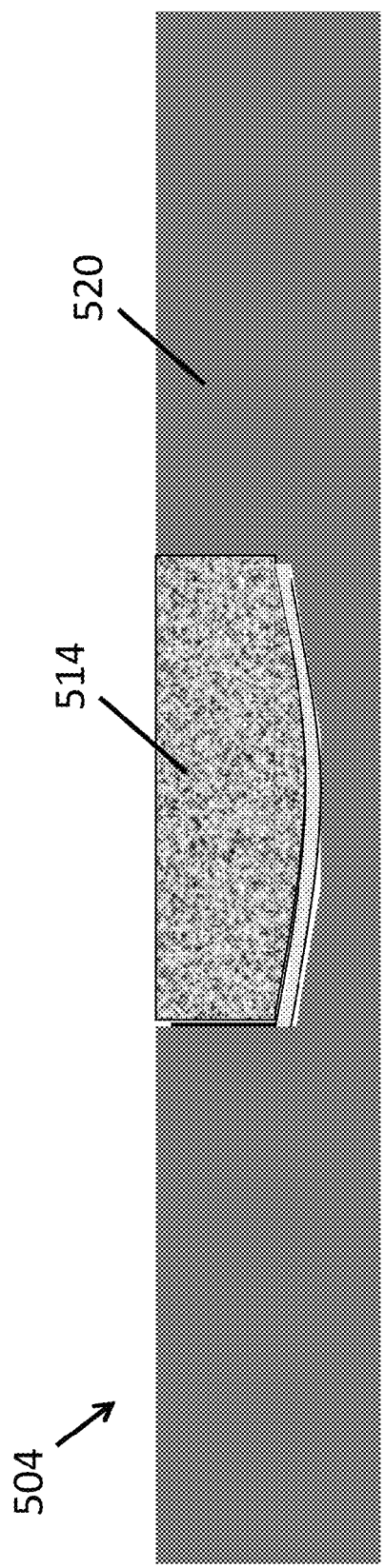

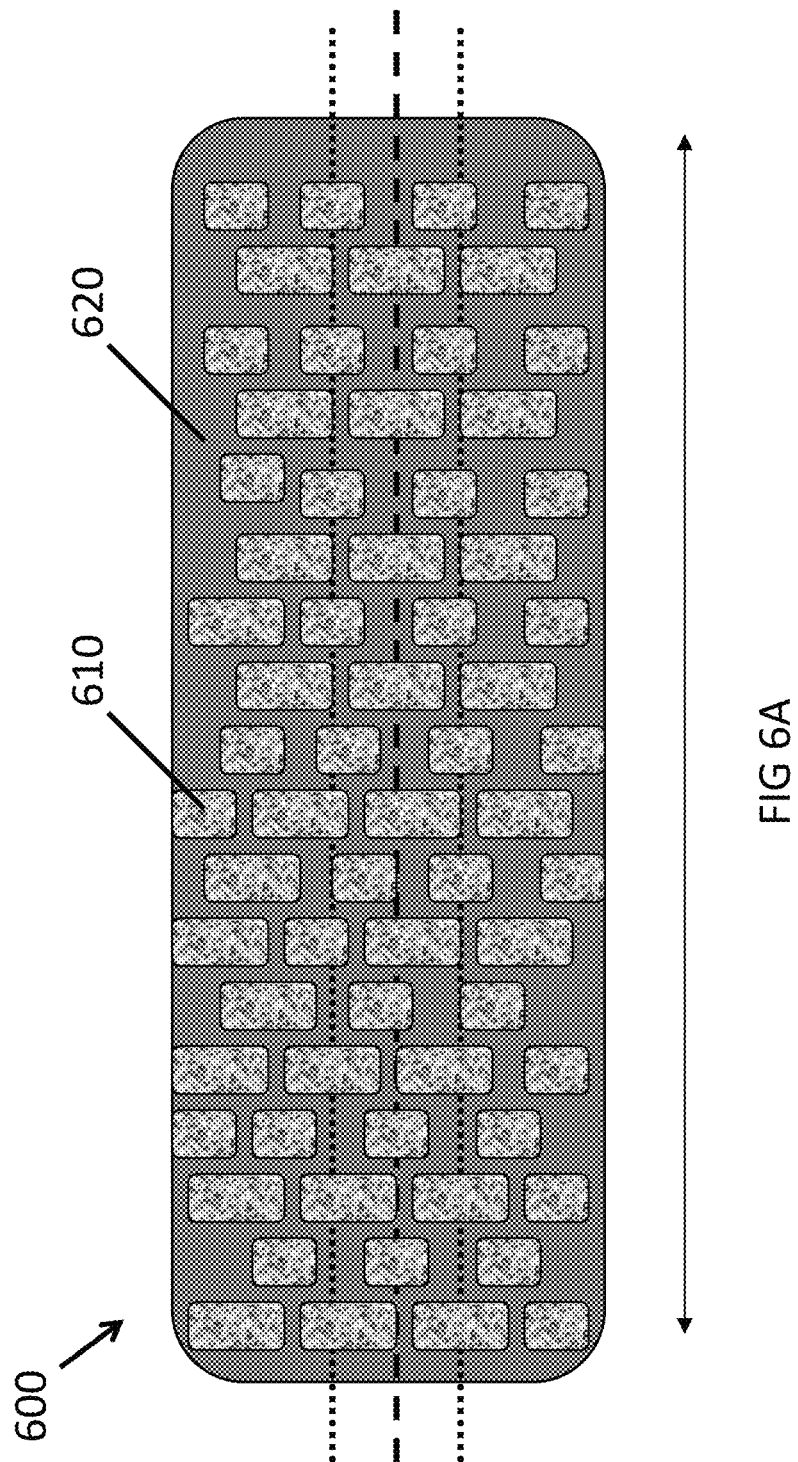

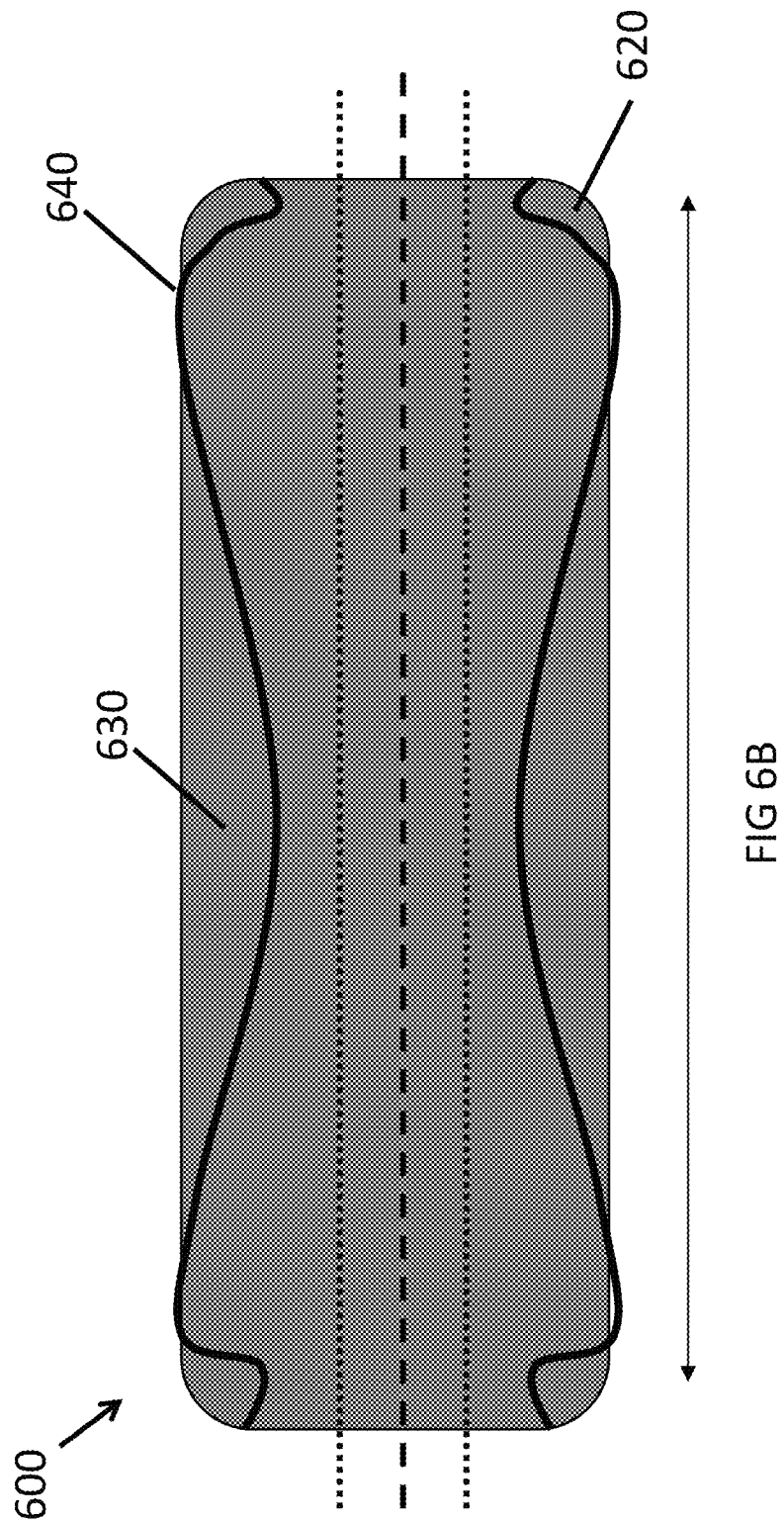

WEAR-RESISTANT ATTACHMENTS FOR HIGH-WEAR APPLICATIONS

RELATED PATENTS

This application is a divisional application of U.S. patent application Ser. No. 12/833,853, filed Jul. 9, 2010, which claims priority to U.S. Provisional Patent Application No. 61/224,426, filed Jul. 9, 2009, and U.S. Provisional Patent Application No. 61/263,286, filed Nov. 20, 2009, the contents of all of which are incorporated by reference herein in their entireties.

FIELD OF THE INVENTION

This disclosure generally relates to wear-resistant assemblies for high-wear applications and, more particularly, to field-repairable wear-resistant attachments for such assemblies.

BACKGROUND OF THE INVENTION

Wear-resistant surfaces are a critical component of many applications. For example, fluid catalytic cracking in petroleum refineries employ "catalyst risers," vessels which undergo severe internal wear from hard ceramic catalysts. Also, paper manufacturing, metal production, and mining rely on rolling processes to form a variety of materials into a desired shape, form, or condition. These processes require the roller to possess wear-resistant surfaces. Because it is common for hardfacing surfaces and ceramic tiles used in such high-wear applications to eventually crack, the surface can rapidly deteriorate, resulting in failure and, consequently, requiring shutdown of the operation and lengthy repair of the hardfacing surface, if repair is even possible.

Typically, the desired characteristics are imparted to the wear-resistant surface by applying a coating or surface treatment directly to the inside of the vessel or to the surface of the roller. Common processes for applying the coating or surface treatment include welding, plating, or thermal spray & fusing techniques. Each technique has its own set of disadvantages. For example, thermal spray coatings may suffer from spalling, cracking, or de-lamination during processing because these coatings are only mechanically bound together and are not strong enough for heavy processes, such as aggregate or heavy ore operations. Also, plating large scale vessels or rollers is impractical, expensive, and environmentally intolerable. Further, plated vessels and rollers are not susceptible to efficient field repair.

Despite their deficiencies, welding or thermal spray & fusing are the methods of choice for treating surfaces. One challenge in hardfacing with welding or spray & fuse techniques lies in generating a surface that is hard enough to resist wear, yet not so hard that the weldment is so brittle that it cracks on either cooling after welding or under load when the roller is put to use. Because of repairability challenges, the compromises made to prevent catastrophic failure due to cracking and spalling result in less than optimal wear. Many different solutions have been developed by users and manufacturers of such industrial processing equipment to overcome these limitations, but many disadvantages remain.

For example, U.S. Pat. No. 4,848,683 to Kawatsu discloses a roller with two types of blocks which differ in wear resistance and which are arranged alternatively. As illustrated in Kawatsu, the body of the roller wears as it is used. Consequently, a fracture in the surface of the roller can propagate throughout the roller body. Even if such a fracture does not destroy the roller body completely, the roller body must be taken out of service and the fracture repaired, if repair is even possible.

U.S. Pat. No. 5,269,477 to Buchholtz et al. discloses a roller with embedded wear-resistant members of a material harder than the roller surface. As with Kawatsu, the roller body is not protected from fracture, necessitating costly and time-consuming repair. Further, a fracture in one wear-resistant member can destroy that member, reducing the efficacy of the roller and exposing the body of the roller to further damage.

Canadian Patent Application 2,202,213 to Patzelt et al. discloses a roller with pin-shaped profiled bodies embedded therein. As above, the body of the roll is not protected from wear. As noted in Patzelt, repair of the roll surface necessitates disassembling the roll, partially removing the roll material, and rebuilding the roll surface. Such a repair process requires considerable time and expense.

U.S. Pat. No. 6,523,767 to Ramesohl discloses roller inserts which can be replaced when worn. An embodiment of Ramesohl includes additional "lamellae" between the inserts to protect the roller body. However, these lamellae are also subject to wear and, moreover, reduce the total surface area of wear-resistant material, thereby reducing the efficacy of the roller. Also, as with Kawatsu, a fracture in one wear-resistant member can destroy that member, further reducing the efficacy of the roller and exposing the body of the roller to damage.

In light of the problems in the prior art, what is needed is a wear-resistant assembly that can be field repaired quickly and inexpensively.

SUMMARY OF THE INVENTION

The invention provides improved assemblies and inserts for use in high-wear applications. In one embodiment, a wear-resistant attachment for insertion in a wear-resistant assembly includes a bottom part and a top part. In this embodiment, the bottom part is configured to be removably inserted into a recess of the wear-resistant assembly and the top part, which comprises a wear-resistant material, is wider than the bottom part in at least one dimension such that the top part covers a surface of the base of the wear-resistant assembly beyond the recess. In another embodiment, a wear-resistant assembly comprises a surface, a base, and a plurality of wear-resistant attachments. In this embodiment, the wear-resistant attachments removably couple to the base and each attachment comprises an inner portion and an outer portion, wherein the outer portion is coupled to the outer portion of at least one other wear-resistant attachment so that the plurality of coupled wear-resistant attachments comprise at least a portion of the surface of the wear-resistant assembly. In yet another embodiment, a wear-resistant insert comprises a plurality of layers, each layer chosen from the group consisting of a hardface material, a tough material, and a joining interface, wherein the plurality of layers comprises at least two layers of a hardface material.

BRIEF DESCRIPTION OF THE DRAWINGS

FIGS. 2A-D illustrate a wear-resistant assemblies 200 and 203 in accordance with exemplary embodiments of the invention.

FIGS. 3A-C illustrate another wear-resistant assembly 300 in accordance with an exemplary embodiment of the invention.

FIGS. 4A-H illustrate replaceable wear-resistant attachments 400-407 in accordance with exemplary embodiments of the invention.

FIGS. 5A-D illustrate wear-resistant assemblies 500, 502, and 504 in accordance with exemplary embodiments of the invention.

FIGS. 6A-D illustrate exemplary wear on a hardface roller, exemplary designs for replaceable wear-resistant attachments in a wear-resistant assembly, exemplary arrangements of replaceable wear-resistant attachments in a wear-resistant assembly, and exemplary arrangements of recesses for receiving attachments in a wear-resistant assembly in accordance with an exemplary embodiment of the invention.

DETAILED DESCRIPTION OF EXEMPLARY EMBODIMENTS

Figure 1A:
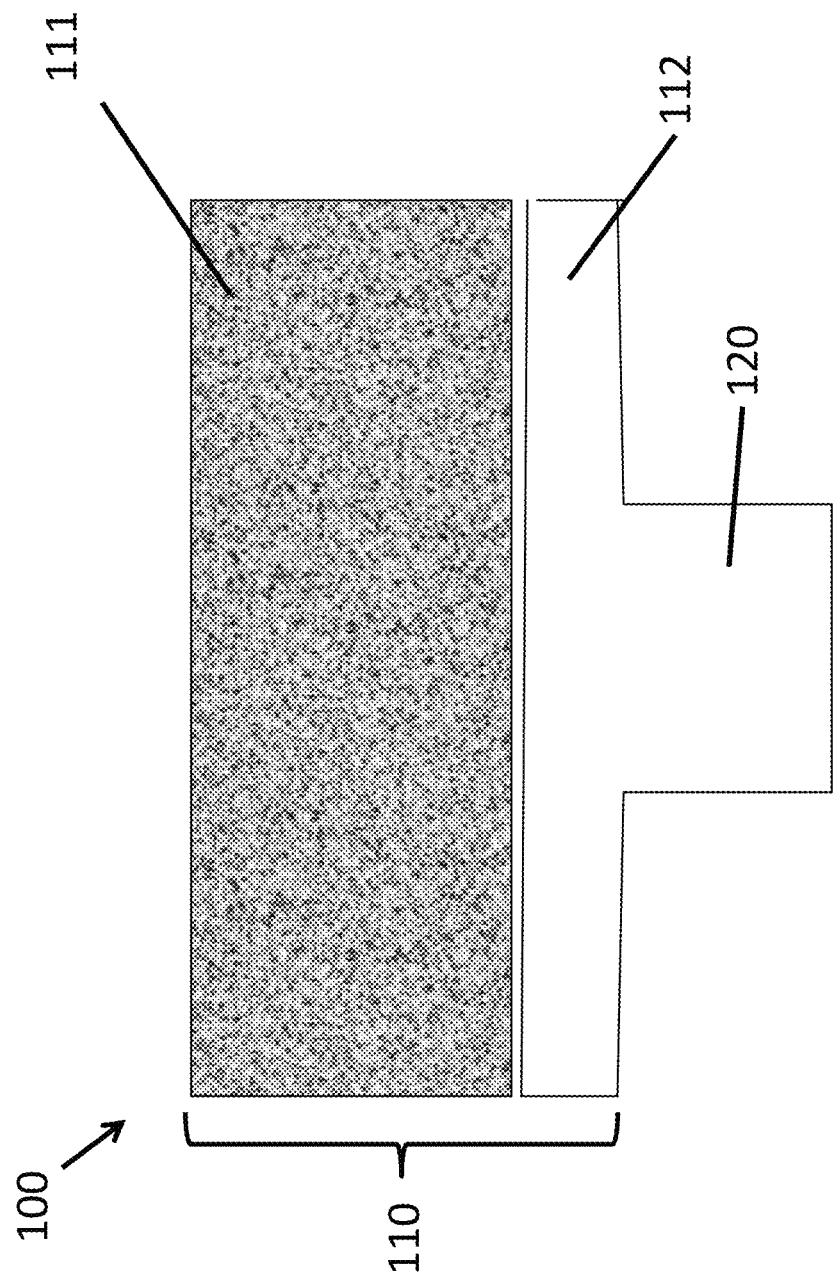
FIGS. 1A-B illustrate replaceable wear-resistant attachments 100 and 102 in accordance with exemplary embodiments of the invention.

In the following description of exemplary embodiments, reference is made to the accompanying drawings which form a part hereof, and in which it is shown by way of illustration specific embodiments in which the invention can be practiced. It is to be understood that other embodiments can be used and structural changes can be made without departing from the scope of the invention.

Described herein are field-replaceable wear-resistant attachments for wear-resistant assemblies. The attachments facilitate rapid repair of such assemblies, thereby saving time and cost. In one embodiment, the field-replaceable attachments include multiple layers of hard-face material, which prevent structural defects propagating through the entire attachment, thereby minimizing the extent of and immediacy for repair. In another embodiment of the invention, the field-replaceable attachments couple to form a continuous surface, at least partially covering the body of the wear-resistant assembly, thereby protecting the body from wear, which provides additional savings in time and cost.

As used herein, the term "joining interface" can be understood to refer to any type of material or structure that is integrated or connected to a wear-resistant attachment to bond or hold components (e.g., hardfacing, tough, tough/wear resistant (encasement) materials, etc.) together. A joining interface may be created with a braze material, glue, or mechanical fastening. However, a myriad number of other techniques may be used to create the joining interface, all of which should be understood to lie within the scope of the invention.

As used herein, the term "hardface material" can be understood to refer to any type of tile, coating, surface, or structural entity which is hard enough to resist material erosion in high-wear applications. This includes, without limitation, ceramics (e.g., tungsten carbide, zirconia, alumina, etc.), certain types of tool steels, and other metals containing hard precipitates, such as oxides and carbides, for example.

As used herein, the term "tool steels" can be understood to refer to known metal alloys for making high-impact or durable tools, which vary in composition depending on the performance requirements of the respective tool.

As used herein, the term "tough material" can be understood to refer to any material which has higher fracture toughness relative to the hardfacing material it supports. This may include, without limitation, copper and other soft metals, plastics, glues, steels, and stronger metals, including stainless and tool steels, for example.

As used herein, the term "tough/wear resistant material" can be understood to refer to a material that can be used as a protective encasement for a hardfacing assembly. This material exhibits a high level of wear resistance and/or material toughness according to the specific application required.

As used herein, the term "wear-resistant assembly" can be understood to refer to an apparatus for high-wear applications comprising an assembly body, wear-resistant attachments, and any attachment/bonding means.

As used herein, the term "wear-resistant attachment" can be understood to refer to an attachment device having a material composition that includes at least one hardface material, for insertion in or coupling to a wear-resistant assembly.

In one embodiment of the invention, field-replaceable wear-resistant attachments are removably attached to a body or surface to be protected. In one embodiment, these attachments comprise a bottom portion and a top portion, where the top portion is wider than the bottom portion. The size difference allows the bottom portion to be removably inserted into a recess in the body of a wear-resistant assembly, such as a roller body or the inside of a catalyst riser vessel, for example, providing both shear-resistance and positioning functions. The greater width of the top portion allows that portion to cover a larger part of the top surface of the roller body, for example, when the attachment is inserted into the body. In this way, the underlying roller body is protected from wear. Additionally, since the wear-resistant attachment can be easily inserted and removed from the roller body or vessel surface, field repairs can be performed quickly and inexpensively.

FIG. 1A illustrates a field-replaceable wear-resistant attachment 100 in accordance with an exemplary embodiment of the invention. Wear-resistant attachment 100 includes top portion 110 and bottom portion 120. Top portion 110 further includes hardface insert 111 and base 112. Hardface insert 111 is configured to provide wear resistance and base 112 is configured to attach wear-resistant attachment 100 to a wear-resistant assembly.

In this embodiment, top portion 110 is wider than bottom portion 120 in at least one dimension. As noted above, the smaller bottom portion 120 allows the attachment to be removably inserted into a recess in the body of a wear-resistant assembly (not shown), such as a roller body or a vessel interior surface while the greater dimension of top portion 110 allows a larger top surface area of the wear-resistant assembly to be protected by the attachment. Accordingly, the body of the wear-resistant assembly is protected from wear, which results in assembly repair necessitating replacement of attachment 100 only.

In some embodiments, the attachments are sized so that a plurality of wear-resistant attachments substantially cover the entire surface of the hard-face assembly. In other embodiments, the attachments are sized to leave space between at least some of the plurality of attachments for removal of fines (e.g., ground-down subject material), for example. The space between the attachments form channels of appropriate dimension to allow the removal of processed materials, if so desired.

Although FIG. 1A illustrates bottom portion 120 as a rectangular pin, it should be understood that bottom portion 120 may take any shape such that top portion 110 can cover a part of the top surface of the wear-resistant assembly. In addition, top portion 110 is illustrated as including a hardface insert 111 and a base 112, but base 112 is optional and, in some embodiments, hardface insert 111 can be attached directly to bottom portion 120. Further, base 112 and bottom 120 may be manufactured separately or as one element. In FIG. 1A, the hardface material is a stand-alone solid formed by casting or sintering. Alternatively, the insert may take the form of a rimmed puck, as described in more detail below with respect to FIG. 1B.

In one embodiment, the hardface insert is made of an amorphous, nanocrystalline, or multiphase polycrystalline hardfacing material powder that is mixed with a binding agent and heat treated at atmospheric, reduced, or increased pressure at a temperature sufficient to cause the binder to create a metallurgical and/or chemical bond among the hardfacing material powder particles. The hardfacing materials and binders can be formed into an attachment by thermal spray or by mixing and forming the "green" mixture into an attachment, or by a combination of both. The hardfacing material may possess a Rockwell C hardness of greater than 60 Rc.

In a further embodiment, the insert is formed by welding or otherwise melting a hardfacing alloy with the desired wear and fracture toughness properties. The hardfacing material may possess a Rockwell C hardness of greater than 60 Rc. In yet a further embodiment, the insert is formed by a stand-alone casting in a mold.

In some embodiments, a combination of the above techniques can be used to form the hardface insert.

Figure 1B:
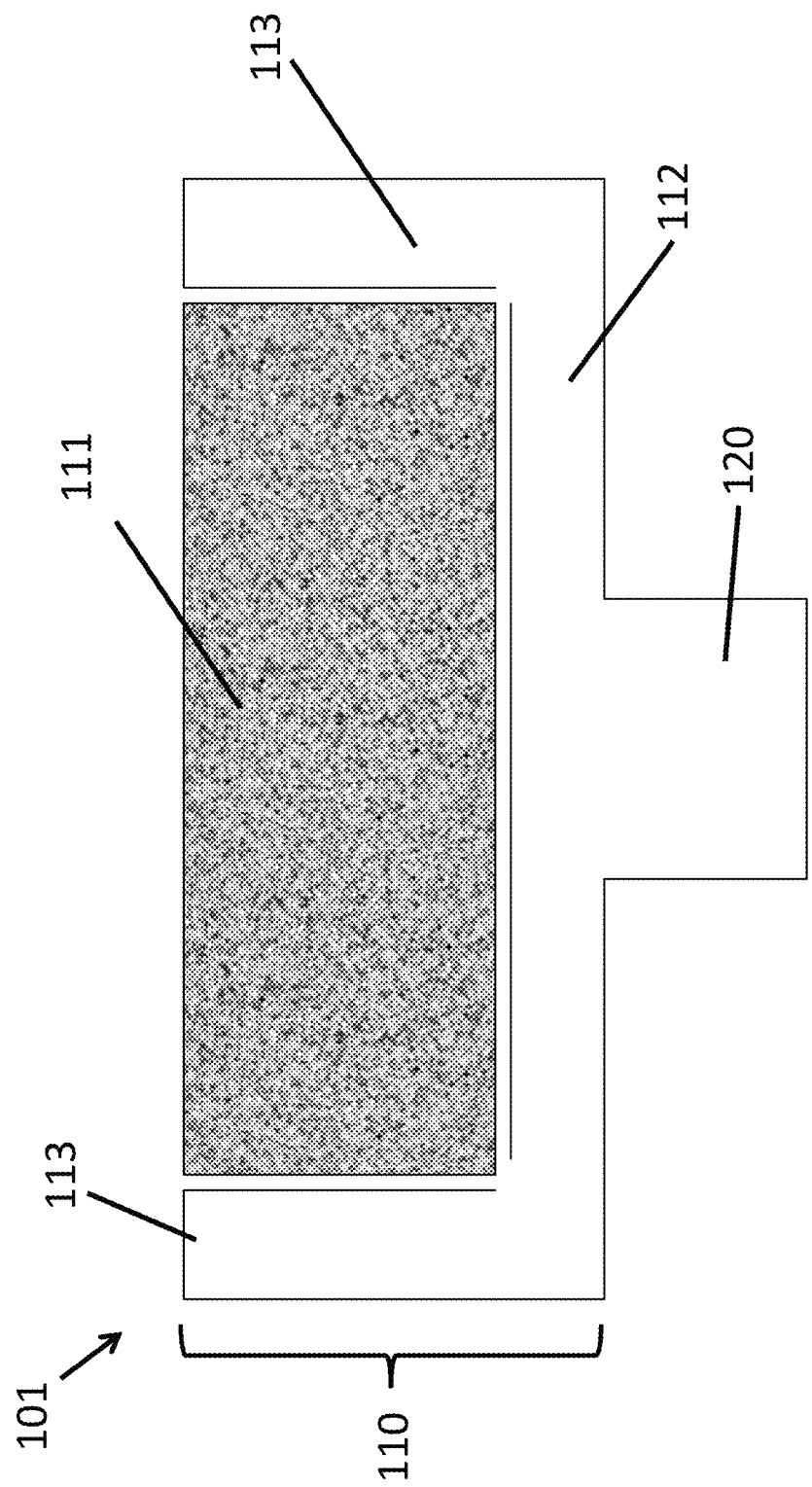

FIG. 1B illustrates another embodiment of a field-replaceable wear-resistant attachment 101. In FIG. 1B, top portion 110 comprises puck walls 113 connected to base 112. Puck walls 113 provide more stability to attachment 101, prevent propagation of structural defects between hardface inserts of multiple attachments, and provide a structure by which to couple multiple wear-resistant attachments by, for example, welding of the puck walls.

Figure 2A:
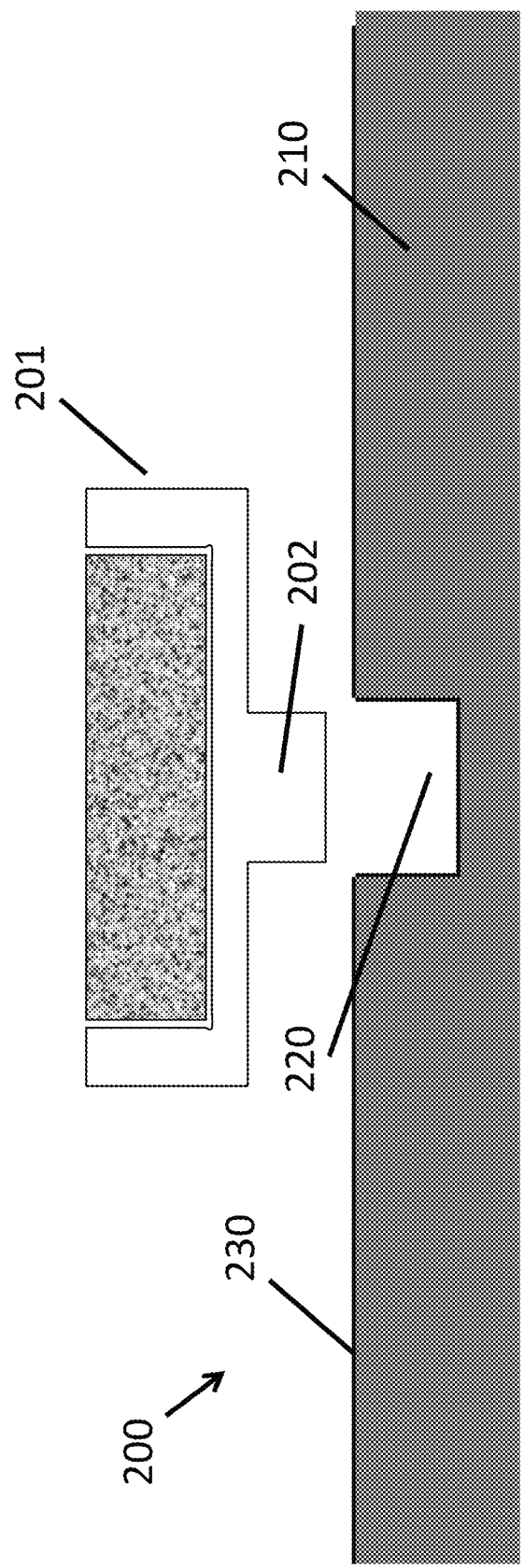

FIG. 2A illustrates an exemplary wear-resistant assembly 200, in accordance with another embodiment of the invention. Wear-resistant assembly 200 includes field-replaceable wear-resistant attachment 201, body 210, recess 220, and top surface 230. Field-replaceable wear-resistant attachment 201 may comprise an embodiment of attachment 100 described above with respect to FIGS. 1A & 1B.

As shown in FIG. 2A, a bottom portion 202 of attachment 201 is configured to be inserted into recess 220 and the top portion of attachment 201 is configured to cover at least a part of the top surface of body 210. As discussed above, this arrangement ensures the body 210 of the wear-resistant assembly 200 is protected from wear. Additionally, the attachments 100 can be quickly and easily replaced when they are worn or damaged, thereby significantly reducing costly downtime of assembly 200 during operation.

FIG. 2B illustrates an exemplary wear-resistant attachment 201 in the inserted position, in accordance with an exemplary embodiment of the invention. Some options for attaching the attachment 201 to body 210 include, but are not limited to, welding 240 or brazing 250. These attachment options may be used alone or in combination. In some embodiments, weld beads at the attachment-body corner do not completely cover the circumference of attachment 201, but only the portion that is visible to the technician, as previously installed adjacent attachments may prevent access to the entire circumference. For instance, a first attachment may receive weld beads covering the entire circumference, but a second attachment positioned adjacent to the first attachment may only receive weld beads at those points not obstructed by the first attachment.

FIG. 2C illustrates another embodiment of a wear-resistant assembly 203. In this embodiment, wear-resistant assembly 203 includes field-replaceable wear-resistant attachment 204, body 210, recess 220, and top surface 230. Attachment 204 includes bottom portion 260 and top portion 270, the latter including hardface insert 271, base 272, and puck walls 273. In this embodiment, a bottom surface of the base 272 of attachment 270 is curved to match the curvature of the top surface 230 of body 210.

Figure 2D:
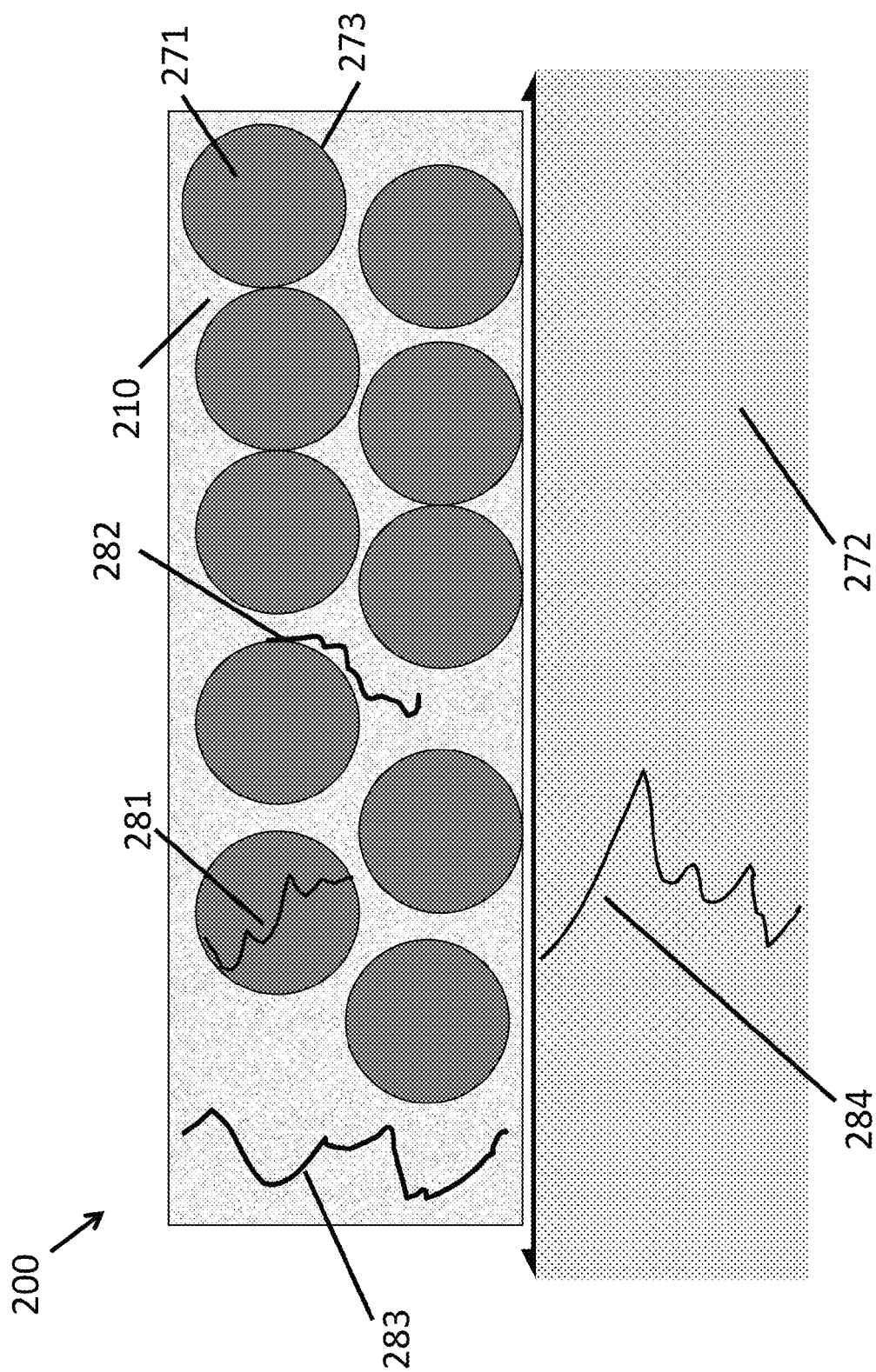

FIG. 2D illustrates some advantages of exemplary wear-resistant assembly 200. Wear-resistant assembly 200 includes assembly body 210, field-replaceable wear-resistant attachments 271, and puck walls 273. A cross-sectional elevated side-view of a wear-resistant attachment 272 is illustrated in the bottom half of FIG. 2D. Also illustrated in FIG. 2D are exemplary fractures 281, 282, 283, and 284 that may result from operation of wear-resistant assembly 200.

As can be seen from FIG. 2D, the invention prevents propagation of cracks by containing fractures in a single attachment, such as fractures 281 and 284, by the puck walls and/or base and preventing the spread of body fractures, such as fractures 282 and 283, into the attachments. In the event that an individual insert develops a crack, the body itself may, according to some embodiments, act to stop the crack from propagating to the body and then to other inserts. In some embodiments, the body may act to limit crack propagation to neighboring particles. In the event that a crack reaches a puck wall, when a walled attachment is employed, the wall may possess sufficient fracture toughness to prevent a crack from propagating through the attachment wall to the roller body. In some embodiments, a weld-filled attachment wall may act to protect the adjacent attachments. Finally, the joint between the attachment and the body to which it is attached may serve as an additional barrier to prevent crack propagation to the body.

FIG. 3A illustrates a wear-resistant assembly 300 in accordance with yet another embodiment of the invention. Wear-resistant assembly 300 includes field-replaceable wear-resistant attachment 301, body 310, recess 320, top surface 330, weld 340, and braze 350. Attachment 301 includes bottom portion 360, including inverted-T 361, and top portion 370, including hardface insert 371, base 372, and puck walls 373. Inverted-T 361 provides another option for attaching attachment 301 to body 310. This attachment option may be used in conjunction with weld 340 or braze 350, or both.

Figure 3B:
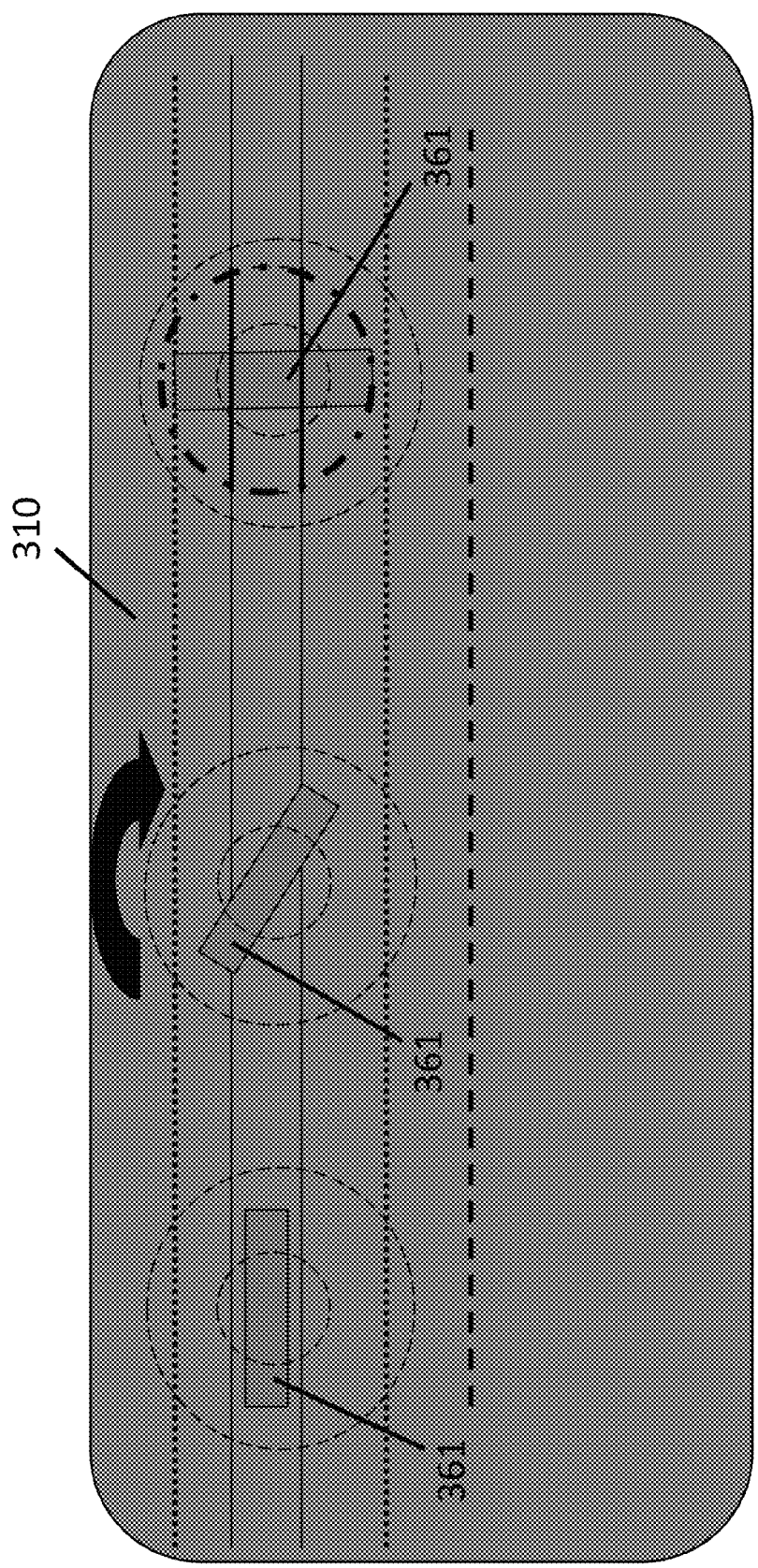

FIG. 3B illustrates a method for inserting attachment 301 into body 310. The attachment 301 is first inserted into the body 301, with the inverted-T aligned with a corresponding groove in the body 310. This inverted groove may be continuous along the length of the roller body or may be limited to individual mounting locations, according to desired attachment patterns and/or for left- and right-handed rollers. After insertion, the attachment 301 is rotated until it reaches its locked position.

It will be readily appreciated by one of skill in the art that inverted-T 361 is offered by way of example only and that the scope of the invention includes any configuration for base 360 which allows for a key-like insertion and rotation to a locked position. Such configurations could take, for example, an "X" shape or a "Y" shape.

Figure 3C:
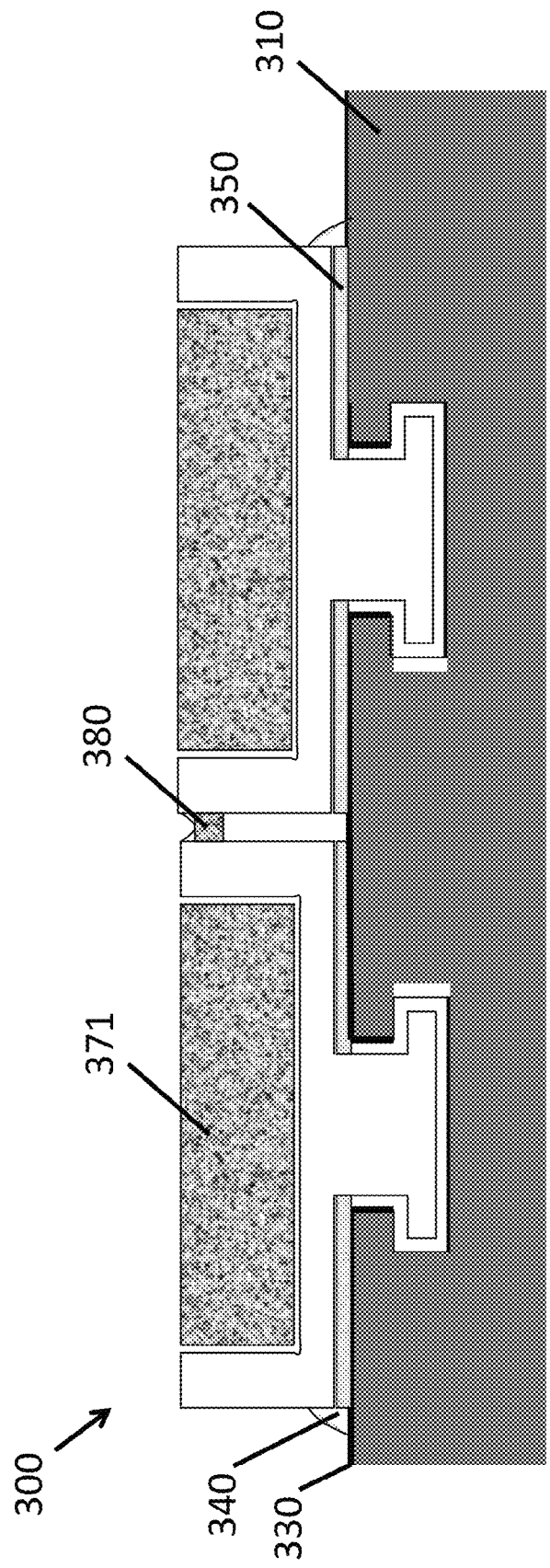

FIG. 3C illustrates wear-resistant assembly 300 in accordance with another embodiment of the invention. Wear-resistant assembly 300 includes multiple attachments coupled via weld 380. In this embodiment, the attachments' puck walls are welded together with a hardfacing welding alloy to provide a firm, secure attachment of the attachments to the roller body. Note that, in some embodiments, the profile of the bead is concave or convex and optimized for the removal of fines.

In further embodiments of the invention, field-replaceable attachments may include hardface inserts comprising a laminate structure, which may include any combination of layers of hardface material, soft, crack-resistant material, tough material, and joining interfaces. The use of layers with varied wear resistance can generate substantially improved fracture/failure rates and provide several barriers to complete insert failure. For example, if a layer of hardfacing material cracks, the invention can prevent propagation of that crack beyond that layer. The cracked layer can then be removed, either naturally or manually, and the next hardfacing layer exposed. In this way, repair of the fractured hardfacing can be automatically or quickly performed without disassembling the hardfacing assembly. In various embodiments, such multi-layered inserts may be formed by using hardfacing/ceramic components and/or metallic components, or combinations thereof depending on desired properties or applications.

In some embodiments, the attachment architecture includes an additional tough material sleeve encasing the insert laminate. The encasement may be brazed, glued, or otherwise joined to the laminate stack, including the "shrink-fit" method described in more detail below. An exemplary advantage of this embodiment is that the tough material sleeve will wear at a faster rate than the hardfacing material. When multiple inserts are coupled together, the faster wear-rate of the sleeves enables the formation of autogenuous layers between the hardface material inserts, thereby increasing the effectiveness of the roller. A further exemplary advantage of this embodiment is that the outer sleeve serves to improve the inherent low fracture toughness of the hardfacing materials, i.e., the sleeve serves to blunt crack propagation and prevent fully cracked sections from falling out of the assembly. The inner portion of this embodiment may take the form of a solid monolithic hardface material or the multi-layer insert described above.

In this embodiment, the fraction of surface area subject to autogeneous layer formation is directly related to the ratio of surface apportioned to tough material, within both the insert and the assembly body, that apportioned to the hardfacing material in the insert. For example, in one embodiment, the inner hardfacing material is manufactured from WC/Co and has a total inner diameter of 1.57 inches and the outer tough material is manufactured from 4140 steel and the outer sleeve is 1.75 inches thick. In another embodiment, the combination between the fractional surface area of the tough material within the insert and the spacing between the inserts results in autogeneous layer formation of 20-70% of the surface area on the assembly surface. In a further embodiment, the optimal surface area fraction is 50% for autogeneous layer build up.

In another exemplary embodiment, the insert is composed of zirconia rods inserted in holes drilled into a tough steel cylinder. In a further embodiment, the insert is composed of nine zirconia rods and a 55.7% tough material surface area, the latter representing the surface area for autogeneous layer formation within the insert.

Figure 4A:
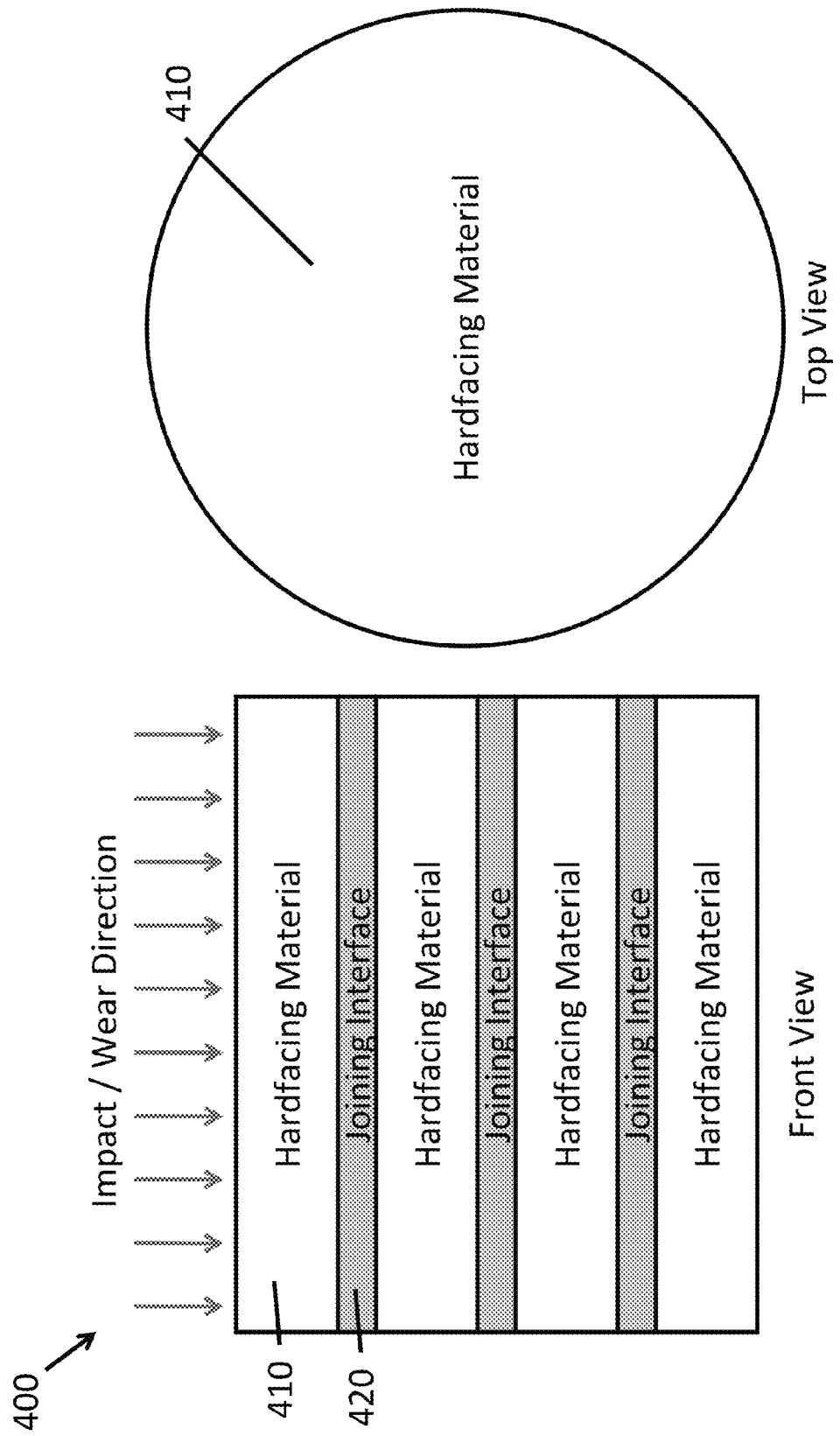

FIG. 4A illustrates an exemplary insert 400 in a front view and a top view. Insert 400 includes alternating layers of a fully-dense hardface material 410 and a joining interface 420, in which the layers are orientated perpendicular to the direction of wear. As noted above, this structure improves the repairability and longevity of the insert. Specifically, if a fracture appears in the top layer of the insert, propagation of that crack is halted at the joining interface. The top layer and joining interface can then be removed, or may be removed through natural wear, exposing the next layer of hardface material.

Figure 4B:
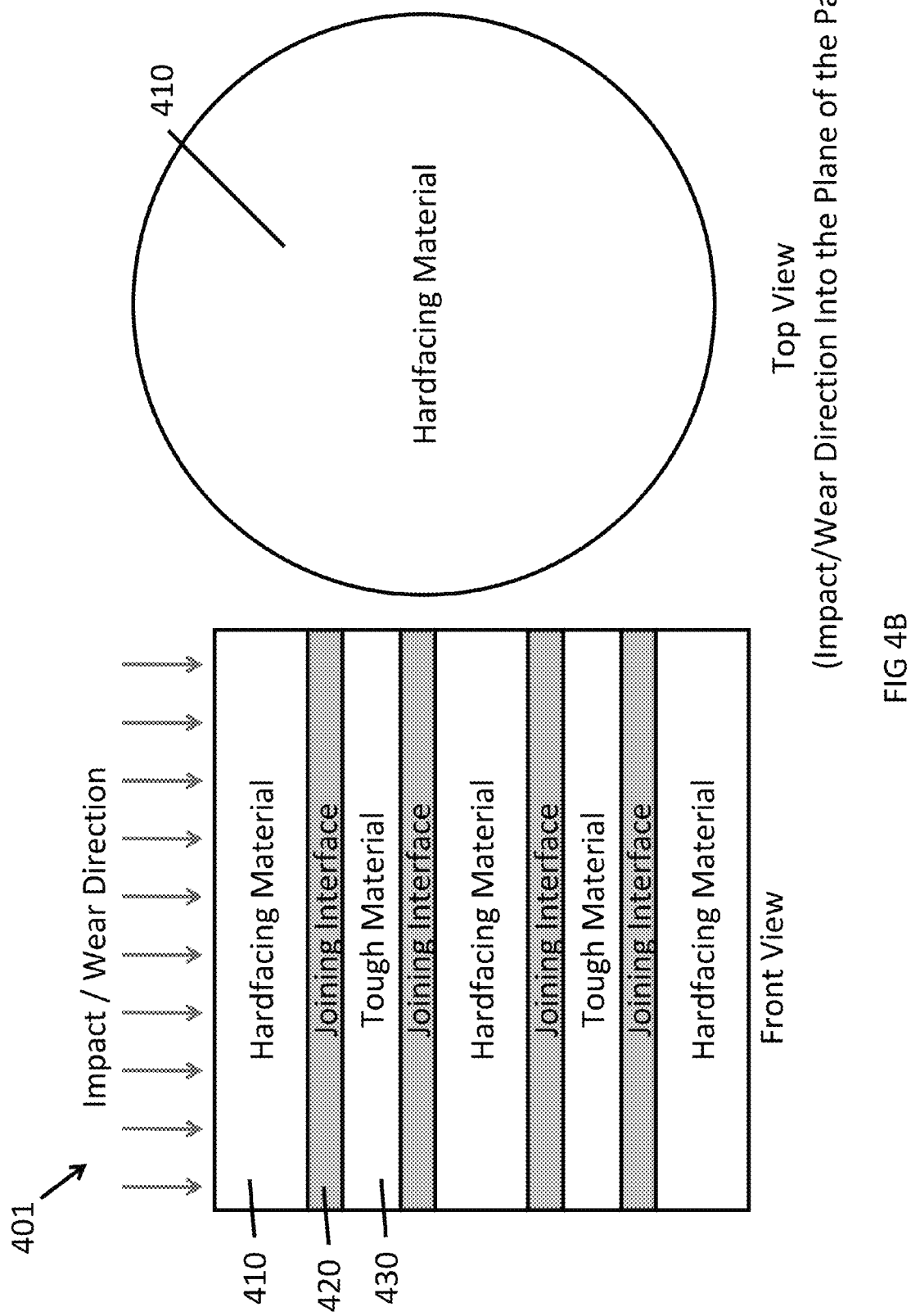

FIG. 4B illustrates another exemplary insert 401 in a front view and a top view. Insert 401 includes alternating layers of a fully-dense hardface material 410, a joining interface 420, and a fully-dense tough material 430, in which the layers are orientated perpendicular to the direction of wear. In some embodiments, the component architecture is composed of fully dense hardfacing tiles joined, e.g., by braze or glue, to a tougher material, thus forming a laminate structure of alternating hardfacing and tough material layers parallel to the loading direction.

In further embodiments, the component architecture can be composed of fully dense hardfacing tiles joined to a fully dense softer material with a braze or glue forming a laminate structure of alternating hardfacing/joining material/soft material/joining material layers with the planes of the layers parallel to the loading direction.

Figure 4C:
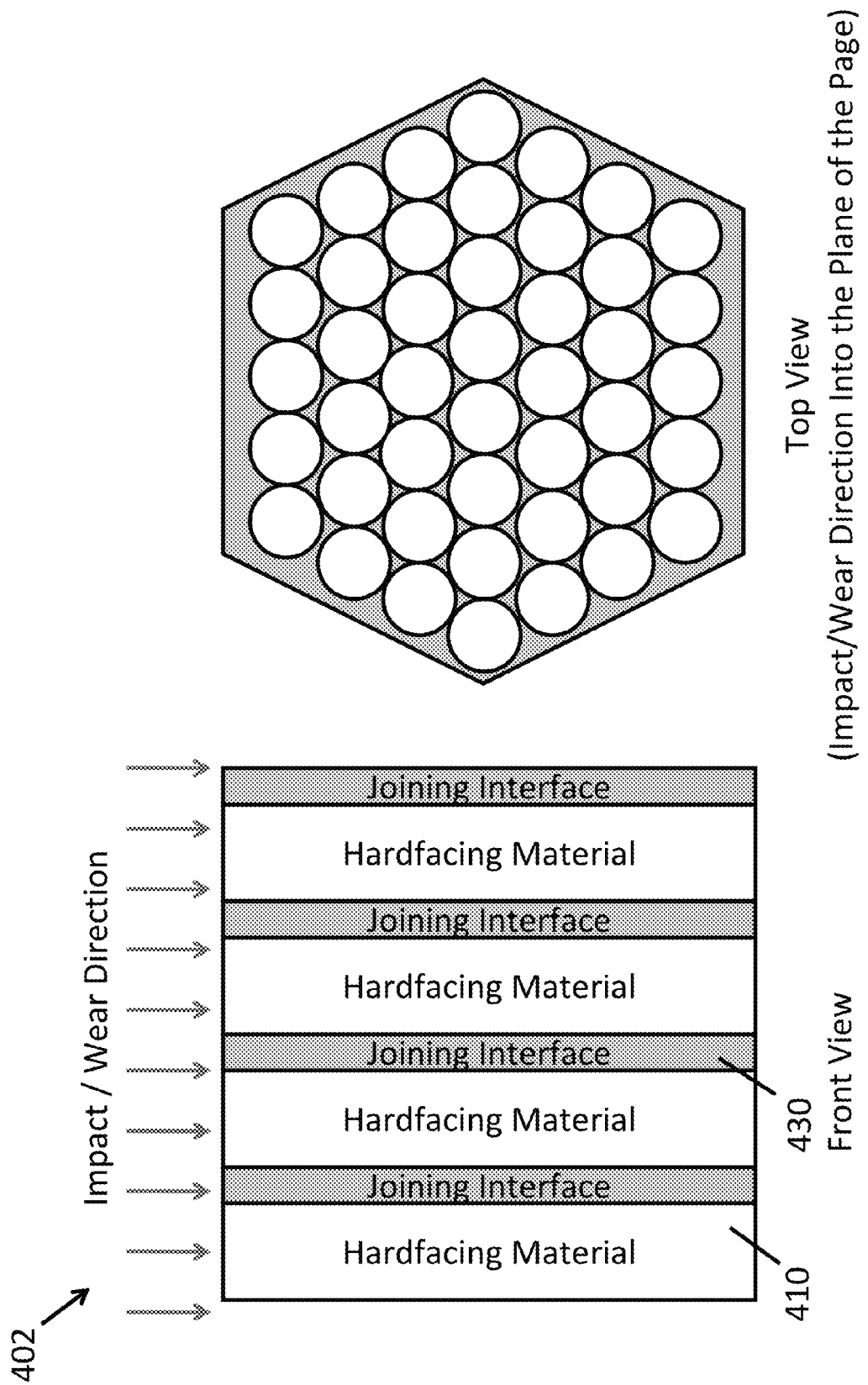

FIG. 4C illustrates a further exemplary insert 402 in a front view and a top view. Insert 402 includes a plurality of rods 410 of hardface material oriented parallel to the direction of wear and housed within a matrix of tough material 430. In some embodiments, tool steel is used as the matrix to house the hardface material, which may consist of, for example, zirconia rods. In other embodiments, stainless steel is used to house the hardface material. The tool and stainless steel may be held in place with epoxy, for example.

Figure 4D:
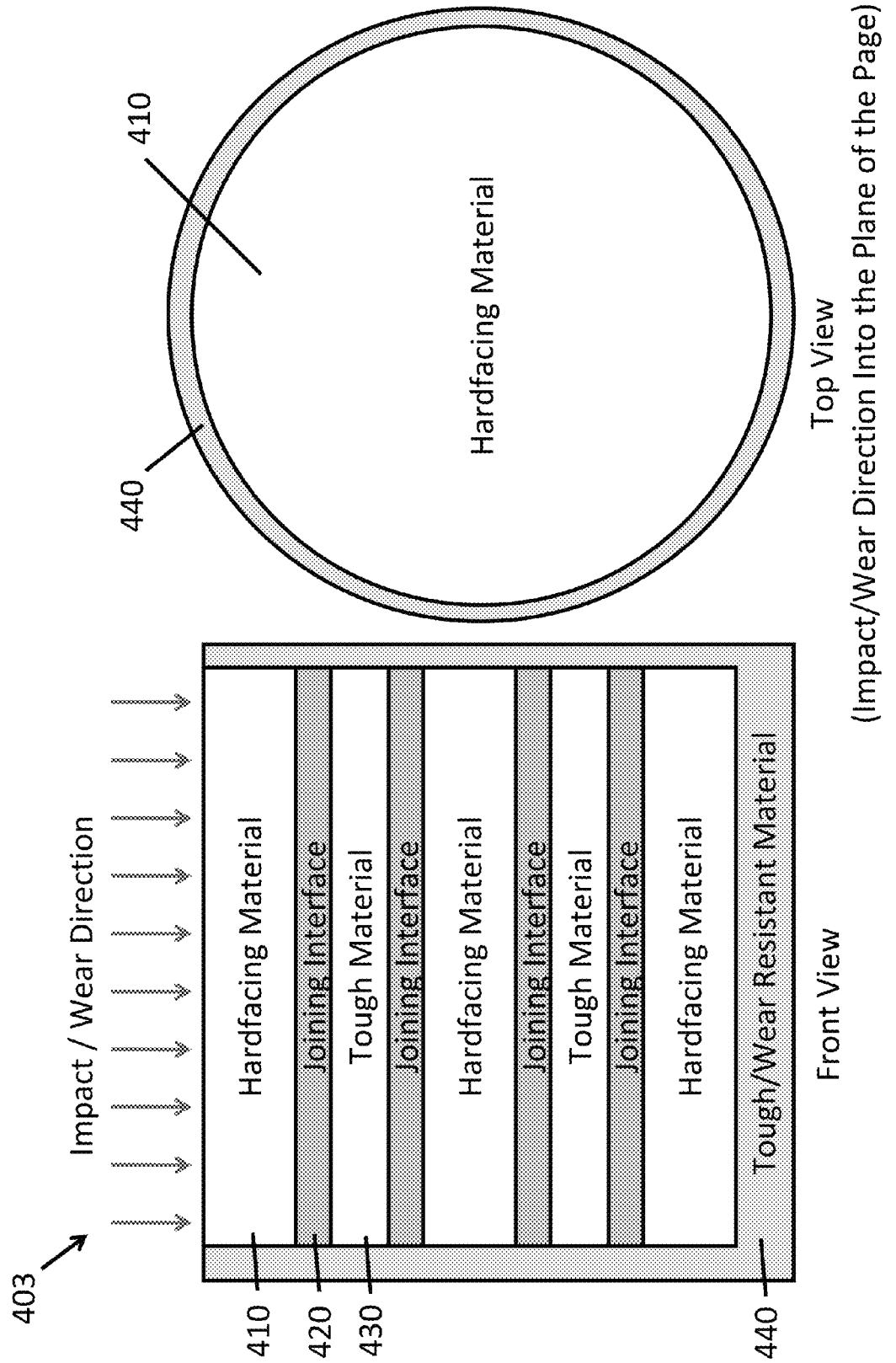

FIG. 4D illustrates another exemplary insert 403 in a front view and a top view. Insert 403 includes alternating layers of a fully-dense hardface material 410, a joining interface 420, and a fully-dense tough material 430, in which the layers are orientated perpendicular to the direction of wear. Insert 403 includes a protective outer sleeve 440 of tough/wear resistant material. As discussed above, this outer sleeve prevents propagation of cracks and may comprise an autogeneous layer when coupled to other outer sleeves.

FIG. 4E illustrates an exemplary insert 404 in a front view and a top view. Insert 404 includes a plurality of layers of a fully-dense hardface material 410 encased in a protective outer sleeve 440 of tough/wear resistant material. In a further embodiment, the plurality of layers of hardface material 410 may be a single solid layer of hardface material 310. Alternatively, the plurality of layers may be different layers of hardface materials.

The layers may be glued or brazed together. In some embodiments, the fully dense hardfacing tiles 410 are stacked together, but otherwise have no joint or bond between them. These tiles may be placed within the protective sleeve 440 and then "shrink-fitted" to maintain the integrity of the structure under high impact and wear conditions. One method of shrink-fitting the outer sleeve is to first pre-heated sleeve 440 to an elevated temperature and insert the stacked hardfacing tiles 410 into the sleeve. Then, the insert is allowed to cool so that the tiles are shrink-fit within the sleeve as it cools.

In some embodiments, a softer material is used within the laminate, thereby producing a stack of hardfacing/soft material alternating layers encased by a protective sleeve. This embodiment can be glued, brazed, or shrink-fit, as described above.

FIG. 4F illustrates an exemplary insert 405 in a front view and a top view. Insert 405 includes alternating layers of a fully-dense hardface material 410 and a fully-dense tough material 430, encased in a protective outer sleeve 440 of tough/wear resistant material.

In some embodiments, protective sleeve 440 is steel, hardface material 410 is tungsten carbide/cobalt, and tough material 430 is copper. In other embodiments, the sleeve is constructed from a material with Rockwell C hardness of 42-47 Rc. Such a material may be, for example, 4140 or 4340 steel or other known composite materials, depending on the properties desired. However, it should be understood that any number of material combinations could be used to provide the functionality of the multi-layered insert described above.

FIG. 4G illustrates two embodiments of exemplary insert 406. Insert 406 includes inner portion 450 and protective sleeve 440 of tough/wear resistant material. Inner portion 450 may be entirely composed of a hardfacing material or may take the form any of the multi-layer embodiments described above with respect to FIGS. 4A-F.

In this embodiment, the level of the inner portion 450 is below or above the level of protective sleeve 440. Such embodiments can be used to hasten the formation of the autogenous layers, described above. Sleeve 440 is illustrated in FIG. 4G as including a bottom wall or enclosure. In other embodiments, sleeve 440 does not include a bottom wall and instead consists of a cylindrical or tubular sleeve encasing with open ends, as illustrated in FIG. 4H.

FIG. 5A illustrates a wear-resistant assembly 500, in accordance with an embodiment of the invention. Wear-resistant assembly 500 includes insert 510 and body 520. Insert 510 may take the form of any of the embodiments described above with respect to FIGS. 4A-4H. As can be seen from FIG. 5A, the insert in this embodiment is placed directly into a recess of the body, rather than attached to the surface.

FIG. 5B illustrates a wear-resistant assembly 502, in accordance with another embodiment of the invention. Wear-resistant assembly 502 includes insert 512 and body 520. Insert 512 includes a curved top surface and may include multiple layers of materials in accordance with any of the embodiments described above with respect to FIGS. 4A-4H.

In this embodiment, the insert curvature is manufactured by designing a mold such that the natural surface tension of the melted hardfacing alloy forms the curved surface. This approach may simplify mold design and may lower cost as only three sides of the mold need to be machined, which can take place, according to some embodiments, in a single machining step utilizing a single cutter. Note that many molds can be machined into a tray and the entire tray inserted into industrial furnace for economical batch processing of many inserts at once.

FIG. 5C illustrates a wear-resistant assembly 504, in accordance with another embodiment of the invention. Wear-resistant assembly 504 includes insert 514 and body 520. Insert 514 includes a curved bottom surface and may include multiple layers of materials in accordance with the embodiments described above with respect to FIGS. 4A-4H. FIG. 5D illustrates the same wear-resistant assembly, but with the insert in the inserted position.

In this embodiment, the curved open "top" of the melt is used as the base of the insert that is attached to the roller body. Also, in some further embodiments, the base of the inserts can be curved in order to minimize sharp corners that can act as stress risers. In some other embodiments, the cracking and porosity due to shrinkage stresses is controlled by designing a mold using a material to which the hardfacing melt does not wet, thus again utilizing the materials' natural surface tension to determine the final shape of the insert as the melt shrinks unconstrained upon cooling into a certain dimension. In yet other embodiments, the insert may be constrained on three sides, while the other three sides may be left unconstrained. In some embodiments, the cavity may be machined such that the radius of the cavity matches that of the insert and each is curved in order to minimize sharp corners that can act as stress risers.

In some embodiments, the inserts may be formed in a variety of shapes and affixed to the hardface assembly in a variety of patterns, depending on which design is optimum for the material to be processed or particular applications. Factors to be considered when electing shapes and/or patterns of the inserts may include (1) providing optimum surface pattern(s) to efficiently crush the target material, (2) resisting compression and shear loads experienced during operation, (3) repairability of worn or damaged attachments, (4) variations in physical properties (e.g., size, hardness, etc) of the target material(s).

Figure 6C:
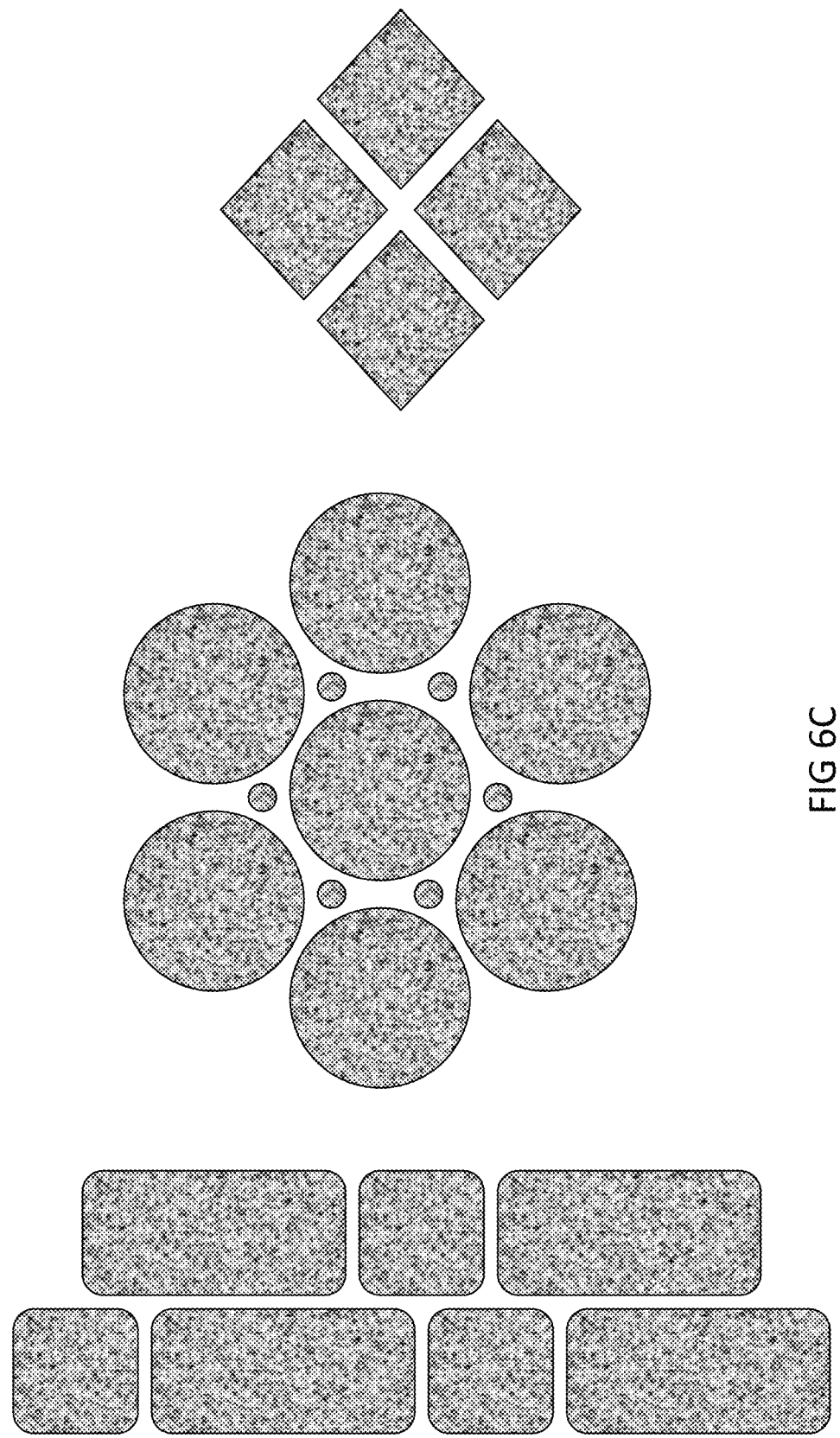

FIG. 6A illustrates a hard facing assembly 600, in accordance with an embodiment of the invention. Hardfacing assembly 600 includes inserts 610 and body 620. The layout of the inserts can be tailored to compensate for wear, to increase service lifetime, or to process different materials. For example, FIG. 6B illustrates the typical wear pattern of a hardfaced roller. After extended use, the new roller profile 630 gives way to the worn roller profile 640. The layout design and composition of the inserts can be tailored to reflect this wear pattern, thereby minimizing the need for repair. For example, rollers under heavy use typically show the highest wear at the edges and the center, as indicated by the areas outside of the profile line 640. Therefore, in some embodiments, attachments can be filled with hardface materials of varying wear characteristics so that the roller surface hardness is tailored from edge-through-center, in order to compensate for these effects. Such an arrangement can substantially increase roller lifetime FIG. 6C illustrates exemplary design layouts for inserts in hardface assemblies. As noted above, the inserts may be positioned to control the spacing and associated grooves between the inserts for the removal of fines generated during crushing and grinding operations. In one embodiment, attachments may butt against each other so that the autogeneuous layer provides optimal spacing between the attachments for the removal of fines. Spacing can be optimized for the type of material being processed.

Figure 6D:
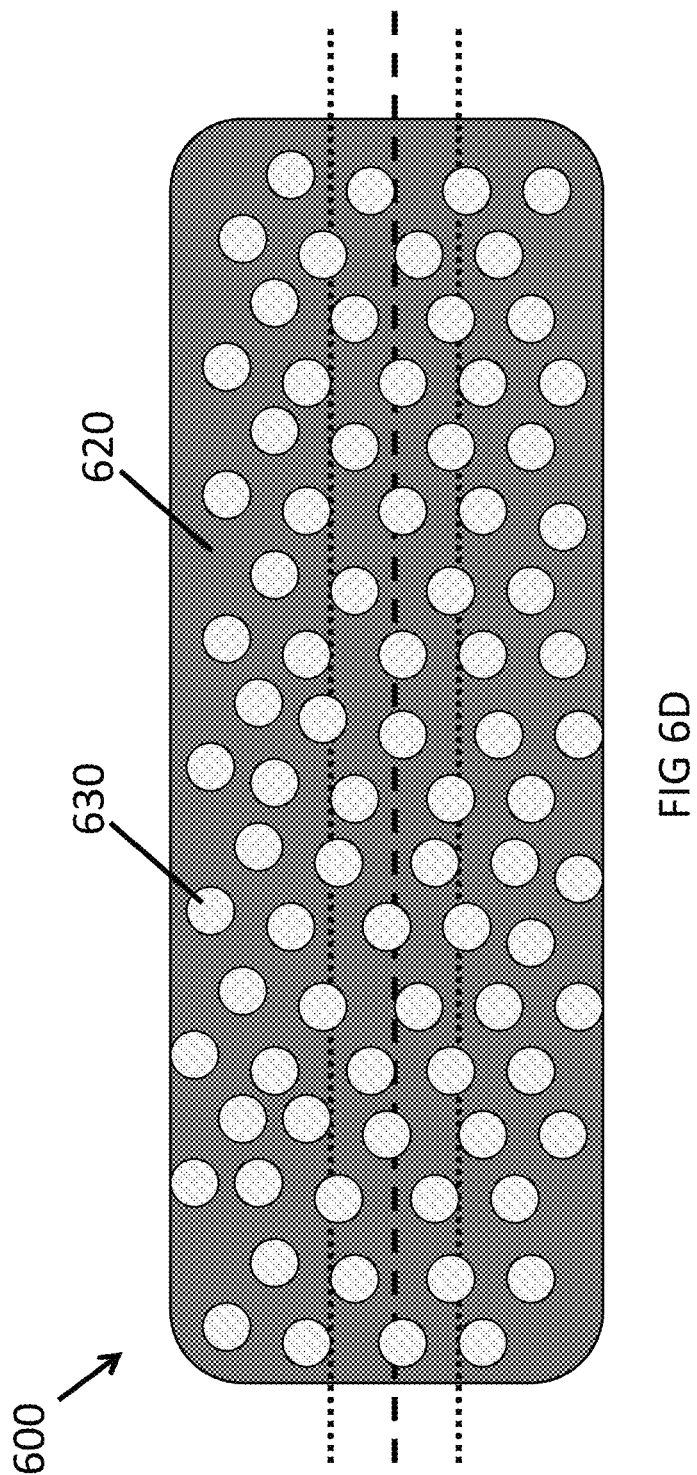

FIG. 6D illustrates an exemplary arrangement of recesses on the body of a hardface assembly 600. Hardfacing assembly 600 includes body 620 and recesses 630.

Figure 7A:
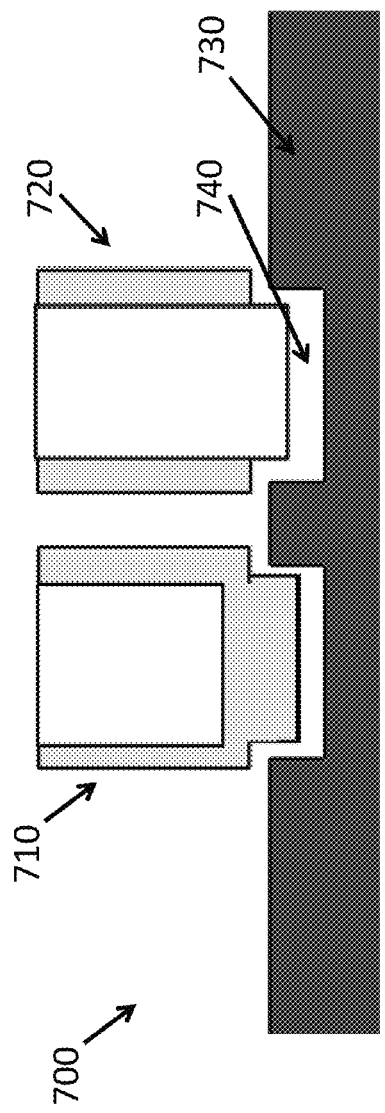
FIGS. 7A-C illustrate exemplary arrangements of replaceable wear-resistant attachments in wear-resistant assemblies 700-702 in accordance with exemplary embodiments of the invention.
Figure 7B:
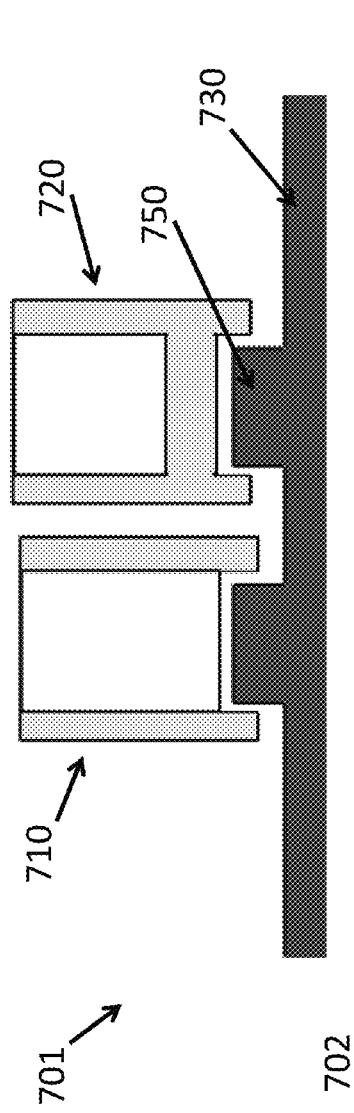
Figure 7C:
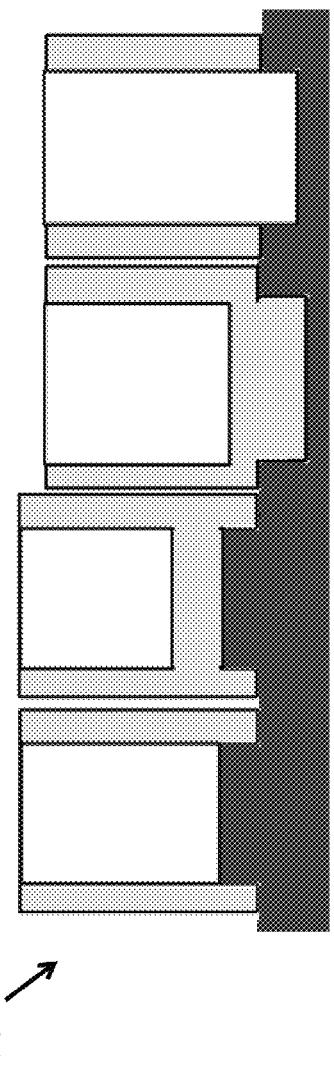

FIG. 7A-C illustrate exemplary attachment methods and inserts, in accordance with exemplary embodiments of the invention. As illustrated in FIG. 7A, the hardface insert may contain a raised pin on its bottom surface corresponding to a matching groove on the roller body 701, such that the hardfacing insert can be fit into the groove and further attached. As shown in FIG. 7A, the raised pin may be formed as part of the attachment encasing, or simply an extension of, the hardface insert. A myriad number of attachment means may be used for this purpose, including, for example, glue, braze, or mechanical fasteners. This design may incorporate the embodiments described above with respect to FIGS. 1-6.

As illustrated in FIG. 7B, the hardface insert may contain a groove on its bottom surface corresponding to a matching raised pin on the roller body 701, such that the hardfacing insert can be fit onto the raised pin and further attached via a joining technique as described herein. The groove may be formed in the encasing or by recessions in the insert. FIG. 7C illustrates that the wear-resistant assembly 702 need not consist of a consistent attachment method and any variation of attachment methods and inserts described herein may be used, if desired.

The hardface assemblies and inserts described herein can be used in any number of applications. For example, the invention may be utilized for the hard surfacing of high pressure grinding rollers, where the materials used are specifically tailored so as to possess the optimal level of toughness and/or hardness for the material being mined. In other applications, the invention is utilized for the hard surfacing of agriculture, heavy industry, or construction equipment. In yet other applications, the invention is utilized to provide a protective layer in the interior of fluid catalytic crackers of, for example, petroleum refineries.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A wear-resistant assembly, comprising:
   a surface;
   a base; and
   a plurality of wear-resistant attachments removably coupled to the base, each of the plurality of wear-resistant attachments comprising an inner portion and an outer portion, wherein the outer portion of each of the plurality of wear-resistant attachments is coupled to the outer portion of at least one other wear-resistant attachment so that a plurality of coupled wear-resistant attachments comprise a substantially-cylindrical and substantially-continuous surface, the substantially-cylindrical and substantially-continuous surface comprising at least a portion of the surface of the wear-resistant assembly, wherein the inner portions of the plurality of wear-resistant attachments comprise a majority of the substantially-cylindrical and substantially-continuous surface.

2. The wear-resistant assembly of claim 1, wherein the inner portion further comprises a plurality of layers, each layer chosen from the group consisting of a hardface material, a tough material, and a joining interface, wherein the plurality of layers comprises at least one layer of a hardface material.

3. The wear-resistant assembly of claim 1, wherein the outer portion further comprises an attachment member selected from the group consisting of a stud and an insert, wherein the attachment member couples the wear-resistant attachment to the base.

4. The wear-resistant assembly of claim 1, wherein the outer portion does not comprise an attachment member selected from the group consisting of a stud and an insert.

5. The wear-resistant assembly of claim 1, wherein the outer portion comprises at least one side-wall.

6. The wear-resistant assembly of claim 5, wherein the at least one side wall is coupled to a side wall of at least one other wear-resistant attachment, and wherein the coupling comprises a filler material between the at least one side wall and the side wall of the at least one other wear-resistant attachment, wherein the filler material is a material that is heated above a melting point of the filler material and allowed to cool when the filler material is between the at least one side wall and the side wall of the at least one other wear-resistant attachment.

7. The wear-resistant assembly of claim 6, wherein the at least one side wall is coupled to a side wall of at least one other wear-resistant attachment by at least one of a weld, a braze, or a solder.

8. The wear-resistant assembly of claim 1, wherein the inner portion comprises a wear-resistant material having a Rockwell C hardness of at least 60 Rc.

* * * * *